United States Patent
Endoh et al.

(10) Patent No.: US 8,154,981 B2
(45) Date of Patent: Apr. 10, 2012

(54) RECORD MEDIUM, ITS MANUFACTURING METHOD, MOTHER DISC FOR RECORD MEDIUM, AND ITS MANUFACTURING METHOD

(75) Inventors: Sohmei Endoh, Miyagi (JP); Takahiro Igari, Miyagi (JP); Makoto Watanabe, Miyagi (JP); Hiroyuki Takemoto, Miyagi (JP); Tadao Suzuki, Miyagi (JP); Katsuhiko Ohtomo, Miyagi (JP); Yuko Asano, Miyagi (JP); Hiroshi Nakayama, Miyagi (JP)

(73) Assignee: Sony Corporation, Tokyo (JP)

( * ) Notice: Subject to any disclaimer, the term of this patent is extended or adjusted under 35 U.S.C. 154(b) by 538 days.

(21) Appl. No.: 11/813,746

(22) PCT Filed: Nov. 16, 2006

(86) PCT No.: PCT/JP2006/323376
§ 371 (c)(1),
(2), (4) Date: Jan. 16, 2009

(87) PCT Pub. No.: WO2007/061019
PCT Pub. Date: May 31, 2007

(65) Prior Publication Data
US 2009/0129252 A1    May 21, 2009

(30) Foreign Application Priority Data
Nov. 17, 2005  (JP) ............................. P2005-333458
Nov. 14, 2006  (JP) ............................. 2006-308483

(51) Int. Cl.
*G11B 7/24* (2006.01)

(52) U.S. Cl. .................................. 369/275.4; 369/283
(58) Field of Classification Search ............. 369/275.2, 369/275.4, 288, 277, 283, 275.3; 264/106; 430/322; 428/64.2, 64.5
See application file for complete search history.

(56) References Cited

U.S. PATENT DOCUMENTS

| | | | |
|---|---|---|---|
| 7,061,850 B1 | 6/2006 | Irie et al. | |
| 7,123,574 B2 * | 10/2006 | Shoji et al. | 369/275.1 |
| 7,136,348 B2 | 11/2006 | Irie et al. | |
| 7,177,262 B2 * | 2/2007 | Kondo et al. | 369/275.4 |
| 7,236,449 B2 * | 6/2007 | Endoh | 369/275.4 |

(Continued)

FOREIGN PATENT DOCUMENTS
EP     1542210 A2     6/2005
(Continued)

OTHER PUBLICATIONS

A European Search Report in counterpart EP Application No. 06823526.6-1232 dated Jan. 5, 2009.

(Continued)

*Primary Examiner* — Ali Neyzari
(74) *Attorney, Agent, or Firm* — SNR Denton US LLP

(57) ABSTRACT

Binary information previously recorded in an innermost rim side area is enabled to be stably reproduced. A record medium is formed by sequentially laminating a first information layer 2, an intermediate layer 3, a second information layer 4, and a cover layer 5 onto a substrate 1. First grooves are previously formed in the innermost rim area of the substrate 1. Second grooves are previously formed in an area where data is recorded. The first grooves are set to be shallower and narrower than the second grooves. Thus, such a situation that a BCA signal is modulated by diffraction due to the grooves can be reduced.

13 Claims, 14 Drawing Sheets

U.S. PATENT DOCUMENTS

| | | | |
|---|---|---|---|
| 7,251,211 B2 * | 7/2007 | Endoh | 369/275.4 |
| 7,298,690 B2 * | 11/2007 | Endoh | 369/275.4 |
| 7,616,552 B2 * | 11/2009 | Abe et al. | 369/275.4 |
| 2003/0137915 A1 | 7/2003 | Shoji et al. | |
| 2004/0022173 A1 | 2/2004 | Kondo et al. | |
| 2005/0169158 A1 | 8/2005 | Abe et al. | |

FOREIGN PATENT DOCUMENTS

| | | |
|---|---|---|
| JP | HEI 08-205075 A | 8/1996 |
| JP | 2001-243636 | 9/2001 |
| JP | 2002-050053 | 2/2002 |
| JP | 2003-281739 | 10/2003 |
| JP | 2005-518055 | 6/2005 |

OTHER PUBLICATIONS

Tomokazu Umezawa, et al., Improvements of Resolution and Surface Roughness using Alkaline Treatment of Photoresist Surface in a High-Density Optical Disk Mastering. Apr. 2003, pp. 1618-1622.

Feng Hua, et al., Processing Dependent Behavior of Soft Imprint Lithography on the 1-10-nm Scale. May 2006, pp. 301-308.

International Search Report dated Dec. 19, 2006.

Japanese Patent Office, Office Action issued in Patent Application JP 2006-308483, on Aug. 3, 2010.

Japanese Patent Office Action corresponding to Japanese Serial No. 2006-308483 dated Jan. 11, 2011.

* cited by examiner

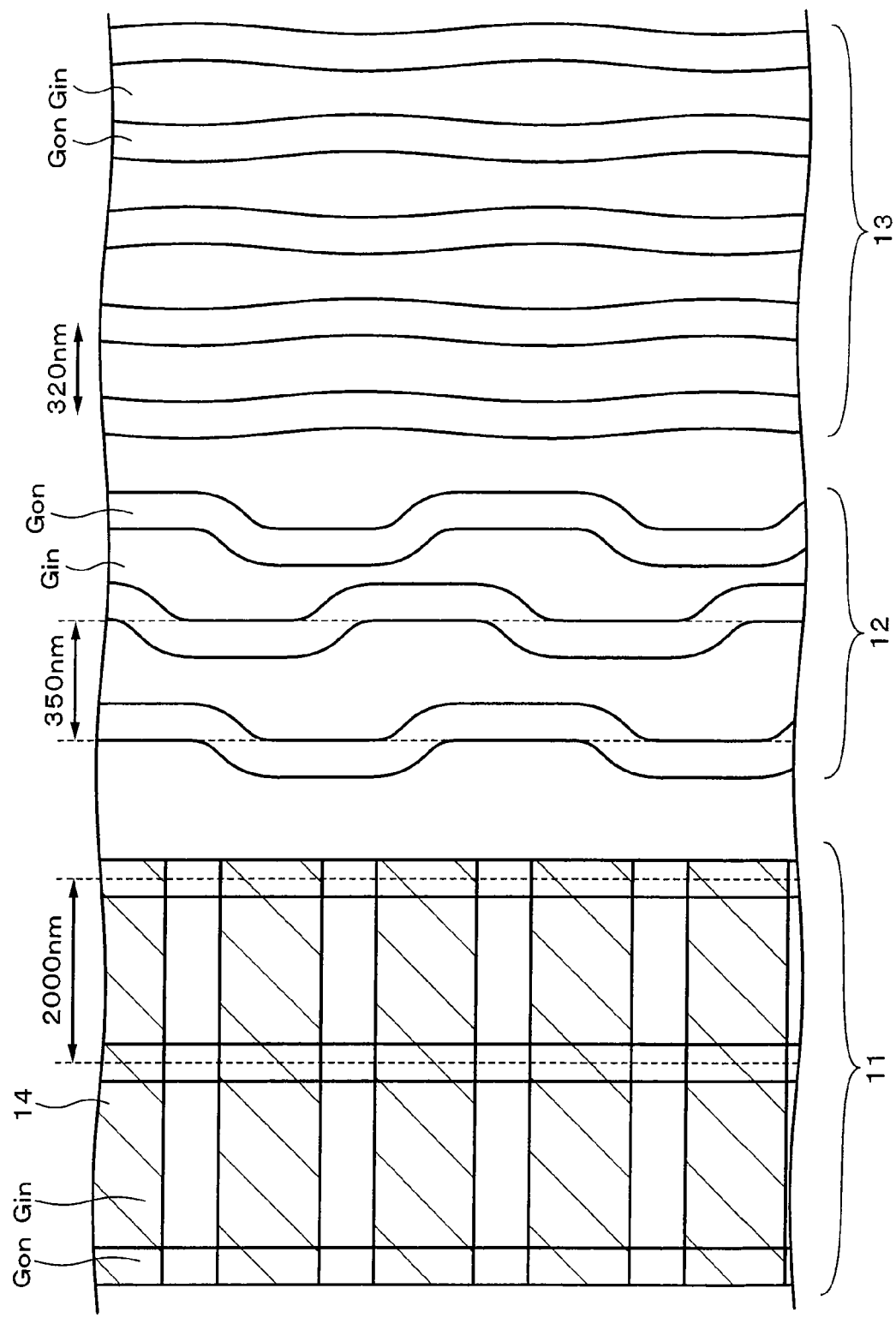

RECORD MEDIUM, ITS MANUFACTURING METHOD, MOTHER DISC FOR RECORD MEDIUM, AND ITS MANUFACTURING METHOD

TECHNICAL FIELD

The invention relates to a record medium, its manufacturing method, a mother disc for the record medium, and its manufacturing method. More particularly, the invention relates to a record medium having at least a first information layer and a second information layer.

BACKGROUND ART

As one of copyright protecting techniques in a DVD (Digital Versatile Disc)-ROM (Read Only Memory), a recording type DVD, and the like, in a state of a non-recorded disc, binary information which is peculiar to a medium and is called a media ID is preliminarily recorded in an innermost rim side area (called BCA (Burst Cutting Area)) and content data which is recorded is encrypted by using the media ID.

Also in a high density optical disc such as a Blu-ray disc (registered trademark; hereinbelow, referred to as BD) or the like, as disclosed in JP-A-2005-518055, such a technique that a bar-code-like mark (hereinbelow, referred to as a BCA mark) as binary information is recorded into the innermost rim side area (hereinbelow, referred to as BCA) has been proposed.

In JP-A-2005-518055, the following techniques have been disclosed: the BCA mark is recorded by using a crystalline state and an amorphous state of a phase change recording film; grooves or pits are formed in the BCA at a track pitch which is five or more times as larger as that of the adjacent area; the BCA mark is formed in the radial direction so as to traverse a plurality of tracks; and the like. Further, in JP-A-2005-518055, the following technique has been disclosed: in the case of reproducing the BCA mark, an alteration of the BCA mark is detected by comparing a reproduction waveform which is obtained when the BCA mark is reproduced by using the grooves by tracking servo control with a reproduction waveform which is obtained when the BCA mark is reproduced without making the tracking servo control.

In a recording area where a signal is recorded to a normal track, the signal is recorded or reproduced in the state where a spot of a laser beam has been in-focused to a signal surface by focusing servo control and the track is accurately traced by the tracking servo control. On the other hand, the BCA is an area which is formed in consideration of a purpose of enabling the information to be more easily read out in the state where the in-focus state according to the focusing servo control has merely been obtained without making the tracking servo control.

Also with respect to the BCA, it is assumed that grooves (that is, tracks) have been formed and a signal recording layer corresponding to the phase change system has continuously been formed from, for example, a lead-in area. In the BCA which is formed so as to have the signal recording layer corresponding to the phase change system as mentioned above, the BCA mark can be formed as follows.

For example, at the manufacturing stage, in the state before initialization, the signal recording layer is in the amorphous state. For example, with respect to a data area, by executing the initialization by irradiating a laser beam by, for instance, a red high-power laser to the whole area, the layer is changed from the amorphous state to the crystalline state. The signal recording layer of the BCA is also in the amorphous state before the initialization. In association with the initialization, the signal recording layer is not set into the crystalline state by initializing the whole BCA but is set into the crystalline state by irradiating the laser beam only to a desired portion in the circumferential direction in correspondence to the BCA mark, for example, a pattern of a bar code corresponding to the contents of a disc ID. As a result of such a step, in the BCA, the information recording in a bar code form by a pattern based on a bar portion in the amorphous state of a predetermined width along the circumferential direction and a bar portion in the crystalline state is executed.

In recent years, to increase a memory capacity in a recordable DVD or a high-density optical disc, a recording and reproducing format of a multi-layer disc has been proposed. In a high-density optical disc of two layers, for example, a BD of two layers, the BCA mark is recorded into an information layer locating on the rear side of the information reading side (referred to as an L0 layer; an information layer locating on this side is referred to as an L1 layer).

FIG. 14 shows an example of a waveform of a reproduction signal of the BCA mark of such a double-layer BD (in the case where the tracking servo control is not made). In the crystalline state, since a reflectance is high, the reproduction signal of a high level IH is obtained. In the amorphous state, since a reflectance is low, the reproduction signal of a low level IL is obtained.

However, in the high-density optical disc in the related art, for example, in the BD, when the tracking servo control is not made, a reproducing laser beam reads the BCA marks from a plurality of grooves. The signal is modulated by a diffraction which is caused by the grooves. Thus, there is such a drawback that, as shown in FIG. 14, a level fluctuation occurs in the reproduction signal of the BCA marks due to a crosstalk of a groove signal, and the signal reproduction of the BCA marks becomes unstable.

According to the standard of the BD, as a reference adapted to stably reproduce the BCA marks, it is specified that a ratio IH/IL (also, referred to as a contrast) between the high level IH and the low level IL of the reproduction signal of the BCA marks is equal to or larger than 4 times. As shown in FIG. 14, when the level fluctuation is large, it is difficult that a ratio between a minimum value IHmin of the high level and a maximum value IHmax the low level satisfies the foregoing standard value.

It is, therefore, an object of the invention to provide a record medium, its manufacturing method, a mother disc for the record medium, and its manufacturing method, in which binary information which has previously been recorded in an innermost rim side area can be stably reproduced.

DISCLOSURE OF INVENTION

To solve the above problems, according to the first invention, there is provided a record medium having at least a first information layer and a second information layer locating over the first information layer, wherein the first information layer is formed on a substrate in which first grooves have previously been formed in a first area and second grooves have previously been formed in a second area, the second information layer is formed on a transparent intermediate layer which is located on the first information layer and on which third grooves have previously been formed, a transparent protecting layer is formed on the second information layer, predetermined binary information has previously been recorded on the first grooves, and the first grooves are shallower or narrower than the second grooves.

According to the second invention of the invention, there is provided a mother disc for a record medium for manufacturing a substrate on which a first information layer of the record medium having at least the first information layer and a second information layer locating over the first information layer is formed, wherein first grooves are formed in a first area and second grooves are formed in a second area, and the first grooves are shallower and/or narrower than the second grooves.

According to the third invention of the invention, there is provided a manufacturing method of a record medium, comprising the steps of:

transferring a shape of a transfer surface of a stamper to a resin material and molding a substrate;

forming a first information layer onto the substrate;

forming an intermediate layer onto the first information layer;

forming a second information layer onto the intermediate layer; and forming a transparent protecting layer onto the second information signal layer, wherein the stamper has first stamper grooves for forming first grooves into an innermost rim area of the substrate and second stamper grooves for forming second grooves into a data recording area of the substrate, and the first stamper grooves are shallower or narrower than the second stamper grooves.

According to the fourth invention of the invention, there is provided a manufacturing method of a mother disc for a record medium, comprising the steps of:

forming resist layers onto a substrate;

forming a first groove pattern by exposing the resist layer existing in an innermost rim area of the substrate;

forming a second groove pattern by exposing the resist layer existing in a data recording area of the substrate; and developing the exposed resist layers, wherein a power of an exposing beam for forming the first groove pattern is smaller than a power of an exposing beam for forming the second groove pattern.

According to the invention, since the depth and width of each groove in the innermost rim area are shallower or narrower than those of each groove in the data recording area, such a situation that the signal is modulated due to the diffraction caused by the grooves in the innermost rim area can be suppressed. That is, a level fluctuation which occurs in a reproduction signal of binary information in the innermost rim area can be reduced.

According to the invention, by setting the depth and width of each groove in the innermost rim area to be shallower or narrower than those of each groove in the data recording area, the diffraction which is caused by the grooves is decreased and the binary information can be preferably reproduced.

BRIEF DESCRIPTION OF DRAWINGS

FIG. 8 is a schematic diagram conceptually showing an example of an arrangement of grooves of an L0 layer of the optical disc according to the embodiment of the invention.

BEST MODE FOR CARRYING OUT THE INVENTION (1) Outline of the Invention

An outline of the invention will be described hereinbelow with respect to a BD of two layers as an example in order to make understanding of the invention easy.

Figure 1:
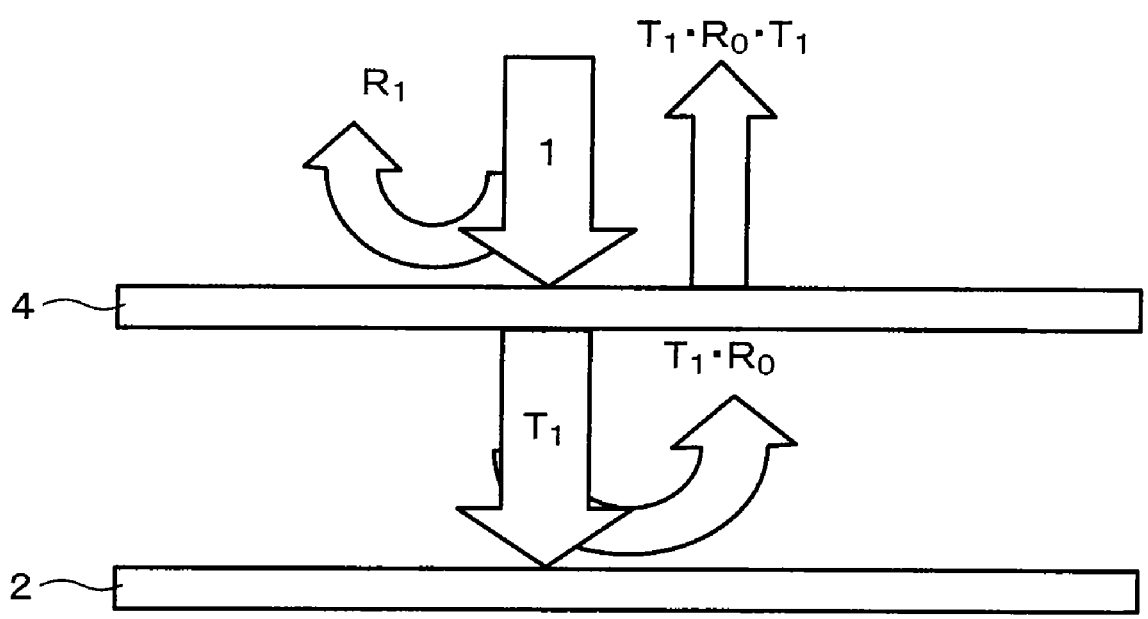
FIG. 1 is a schematic diagram for explaining a relation between reflectance of an L0 layer and that of an L1 layer.

First, a relation between reflectance of an L0 layer 2 and that of an L1 layer 4 will be described with reference to FIG. 1.

Assuming that an amount of reflection light from the L0 layer 2 and that from the L1 layer 4 are equal, the following relational equation is satisfied.

$$R_1 = T_1 \cdot R_0 \cdot T_1 \quad (1)$$

where, $R_0$: reflectance of the L0 layer 2
$R_1$: reflectance of the L1 layer 4
$T_1$: transmittance of the L1 layer 4

Assuming that heat absorption amounts of the L0 layer 2 and the L1 layer 4 are equal, that is, sensitivities are equal, the following relational equation is satisfied.

$$1 - R_1 - T_1 = T_1 - T_1 \cdot R_0 \quad (2)$$

By erasing $T_1$ from the equations (1) and (2), $$R_0 = ((R_1+1)^2 \pm \sqrt{((R_1+1)^4 - 16R_1^2)})/2R_1 \quad (3)$$

Figure 2:
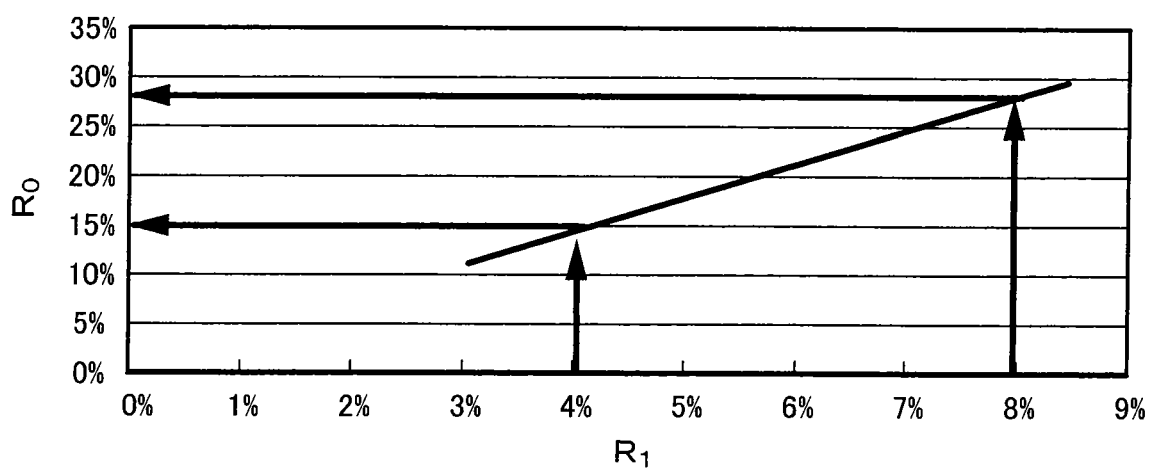
FIG. 2 is a graph showing a relation between reflectance $R_1$ and reflectance $R_0$.

Since $0 \leq R_0 \leq 1$, only the symbol "−" becomes a solution. Therefore, the relation between the reflectance $R_1$ and the reflectance $R_0$ in the equation (3) is as shown in a graph of FIG. 2.

Figure 3:
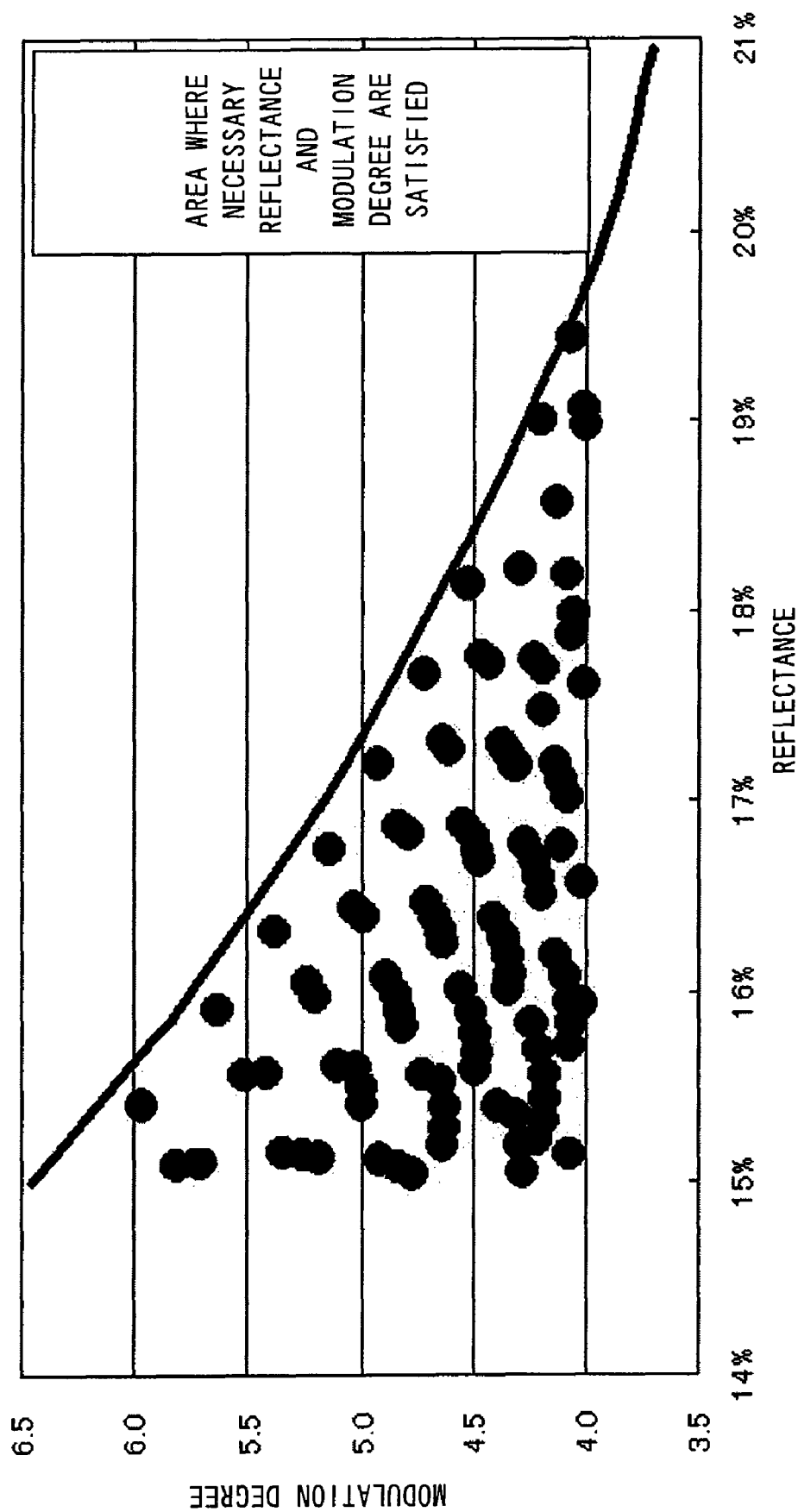
FIG. 3 is a graph showing a relation between the reflectance and a modulation degree.

A relation between the reflectance and the contrast is as shown in FIG. 3 by a calculation of a multiple interference. This indicates that when the reflectance is raised, the contrast decreases.

According to the standard, since it is requested that the reflectance $R_1$ lies within a range from 4 to 8%, a range of the reflectance $R_0$ is set to 15% to 28%. Therefore, in a design, a value near 20% as a value near the center of such a range is used.

Subsequently, a relation between a contrast Rc/Ra (Rc: reflectance in a crystalline state, Ra: reflectance in an amorphous state) and the reflectance Rc will be described with reference to Table 1 and FIG. 4.

A construction of samples used to obtain those relations will now be described.

Each sample has a construction in which an Ag alloy layer (reflecting layer), an SiN layer (second dielectric layer), a ZnS—SiO$_2$ layer (first dielectric layer), an SbTe system phase change recording layer (phase change recording layer), an SiN layer (first dielectric layer), a ZnS—SiO$_2$ layer (second dielectric layer), and an SiN layer (third dielectric layer) are sequentially laminated onto a substrate. A film thickness of each sample and an Sb/Te ratio are changed as shown in Table 1.

Table 1 shows the film thickness of each layer, the Sb/Te ratio of the L0 layer 2, the reflectance, the contrast Rc/Ra, and the like. FIG. 4 is a graph showing the relation between the contrast Rc/Ra and the reflectance Rc formed on the basis of Table 1.

In an evaluation column of the reflectance and contrast in Table 1, "○" shows the case where the reflectance Rc is equal to or larger than 20% and the contrast Rc/Ra is equal to or larger than 4.4. "Δ" shows the case where Rc>20% and 4<Rc/Ra<4.4. "x" shows the case where those numerical value ranges are not satisfied. In Table 1, the case where the contrast Rc/Ra is equal to or larger than 4.4 is determined to be good and is marked by "○" in consideration of a manufacturing margin and the like. However, even if the contrast Rc/Ra is larger than 4, the standard can be satisfied.

TABLE 1

| Ag ALLOY (REFLECTING LAYER) [nm] | SiN (2ND DIELECTRIC LAYER) [nm] | ZSS (1ST DIELECTRIC LAYER) [nm] | Sb—Te SYSTEM (PHASE CHANGE RECORDING LAYER) [nm] | Sb/Te RATIO | SiN (1ST DIELECTRIC LAYER) [nm] | ZSS (2ND DIELECTRIC LAYER) [nm] | SiN (3RD DIELECTRIC LAYER) [nm] | REFLECTANCE OF CRYSTALLINE PORTION Rc | REFLECTANCE OF AMORPHOUS PORTION Ra | CONTRAST Rc/Ra | REFLECTANCE AND CONTRAST |
|---|---|---|---|---|---|---|---|---|---|---|---|
| 140 | 10 | 12 | 11 | 3.7 | 30 | 12 | 12 | 16.5 | 2.3 | 7.17 | x |
|  | 10 | 12 | 11 | 3.7 | 30 | 12 | 14 | 17.2 | 2.8 | 6.14 | x |
|  | 10 | 12 | 11 | 3.7 | 30 | 12 | 16 | 18.2 | 3.3 | 5.52 | x |
|  | 10 | 12 | 11 | 3.7 | 30 | 12 | 18 | 18.7 | 3.7 | 5.05 | x |
|  | 10 | 12 | 11 | 3.7 | 30 | 12 | 20 | 19.5 | 4.1 | 4.76 | x |
|  | 10 | 12 | 11 | 3.7 | 16 | 10 | 30 | 14.4 | 1.5 | 9.60 | x |
|  | 10 | 12 | 11 | 3.7 | 18 | 10 | 30 | 15.5 | 1.9 | 8.16 | x |
|  | 10 | 12 | 11 | 3.7 | 16 | 13 | 28 | 16.1 | 2.2 | 7.32 | x |
|  | 10 | 12 | 11 | 3.7 | 18 | 11 | 28 | 15.6 | 2 | 7.80 | x |
|  | 10 | 12 | 11 | 3.7 | 22 | 10 | 24 | 15.1 | 1.8 | 8.39 | x |
|  | 10 | 12 | 11 | 3.7 | 30 | 10 | 14 | 14.9 | 1.7 | 8.76 | x |
|  | 10 | 12 | 11 | 3.7 | 10 | 32 | 10 | 21.1 | 5.2 | 4.06 | Δ |
|  | 10 | 10 | 11 | 3.7 | 10 | 16 | 30 | 17.3 | 2.7 | 6.41 | x |
|  | 10 | 14 | 11 | 3.7 | 15 | 16 | 30 | 16.1 | 2.1 | 7.67 | x |
|  | 15 | 10 | 11 | 3.7 | 15 | 16 | 30 | 16.9 | 2.5 | 6.76 | x |
|  | 10 | 12 | 11 | 3.7 | 15 | 16 | 25 | 16.7 | 2.4 | 6.96 | x |
|  | 10 | 10 | 11 | 3.7 | 15 | 16 | 20 | 16.4 | 2.4 | 6.83 | x |
|  | 10 | 10 | 11 | 3.7 | 10 | 16 | 30 | 17.5 | 3.4 | 5.15 | x |
|  | 9 | 10 | 11 | 3.7 | 10 | 16 | 30 | 17.5 | 3.2 | 5.47 | x |
|  | 8 | 10 | 11 | 3.7 | 10 | 16 | 30 | 20.4 | 6.2 | 3.29 | x |
|  | 7 | 10 | 11 | 3.7 | 10 | 16 | 30 | 19.7 | 5.2 | 3.79 | x |
|  | 8 | 10 | 11 | 3.7 | 11 | 16 | 30 | 18.7 | 3.8 | 4.92 | x |
|  | 7 | 10 | 11 | 3.7 | 12 | 16 | 30 | 20.2 | 4.09 | 4.94 | ○ |
|  | 6 | 10 | 11 | 3.7 | 13 | 16 | 30 | 21.3 | 5.6 | 3.80 | x |
|  | 8 | 10 | 11 | 3.7 | 12 | 16 | 30 | 20.6 | 5.7 | 3.61 | x |
|  | 9 | 10 | 11 | 3.7 | 11 | 16 | 30 | 19.6 | 5 | 3.92 | x |
|  | 9 | 10 | 11 | 3.7 | 12 | 16 | 30 | 19.1 | 4.2 | 4.55 | x |
|  | 10 | 12 | 10 | 3.8 | 10 | 32 | 10 | 21.1 | 4.8 | 4.40 | ○ |
|  | 10 | 12 | 11 | 3.8 | 10 | 32 | 10 | 21 | 5 | 4.20 | Δ |
|  | 10 | 12 | 12 | 3.8 | 10 | 32 | 10 | 21 | 5.2 | 4.04 | Δ |
|  | 10 | 12 | 13 | 3.8 | 10 | 32 | 10 | 21.1 | 5.1 | 4.14 | Δ |
|  | 10 | 12 | 10 | 3.9 | 10 | 32 | 10 | 21 | 4.9 | 4.29 | Δ |
|  | 10 | 12 | 11 | 3.9 | 10 | 32 | 10 | 20.7 | 4.7 | 4.40 | ○ |
|  | 10 | 12 | 12 | 3.9 | 10 | 32 | 10 | 20.3 | 4.8 | 4.23 | Δ |
|  | 10 | 12 | 13 | 3.9 | 10 | 32 | 10 | 20.5 | 4.9 | 4.18 | Δ |
|  | 10 | 12 | 10 | 4.0 | 10 | 32 | 10 | 20.6 | 4.8 | 4.29 | Δ |
|  | 10 | 12 | 11 | 4.0 | 10 | 32 | 10 | 20.2 | 4.7 | 4.30 | Δ |
|  | 10 | 12 | 12 | 4.0 | 10 | 32 | 10 | 20.3 | 4.7 | 4.32 | Δ |
|  | 10 | 12 | 13 | 4.0 | 10 | 32 | 10 | 20.3 | 5.1 | 3.98 | x |
|  | 10 | 12 | 10 | 4.1 | 10 | 32 | 10 | 22.1 | 6.6 | 3.35 | x |
|  | 10 | 12 | 11 | 4.1 | 10 | 32 | 10 | 20.6 | 4.9 | 4.20 | Δ |
|  | 10 | 12 | 12 | 4.1 | 10 | 32 | 10 | 20.4 | 4.9 | 4.16 | Δ |

As mentioned above, to satisfy (the range of the reflectance $R_1$=4 to 8%) as a standard value, the reflectance of about 20% is requested as a reflectance $R_0$ of the L0 layer 2. According to the standard, it is requested that the contrast IH/IL, that is, the contrast Rc/Ra is set to be equal to or larger than 4.

Figure 4:
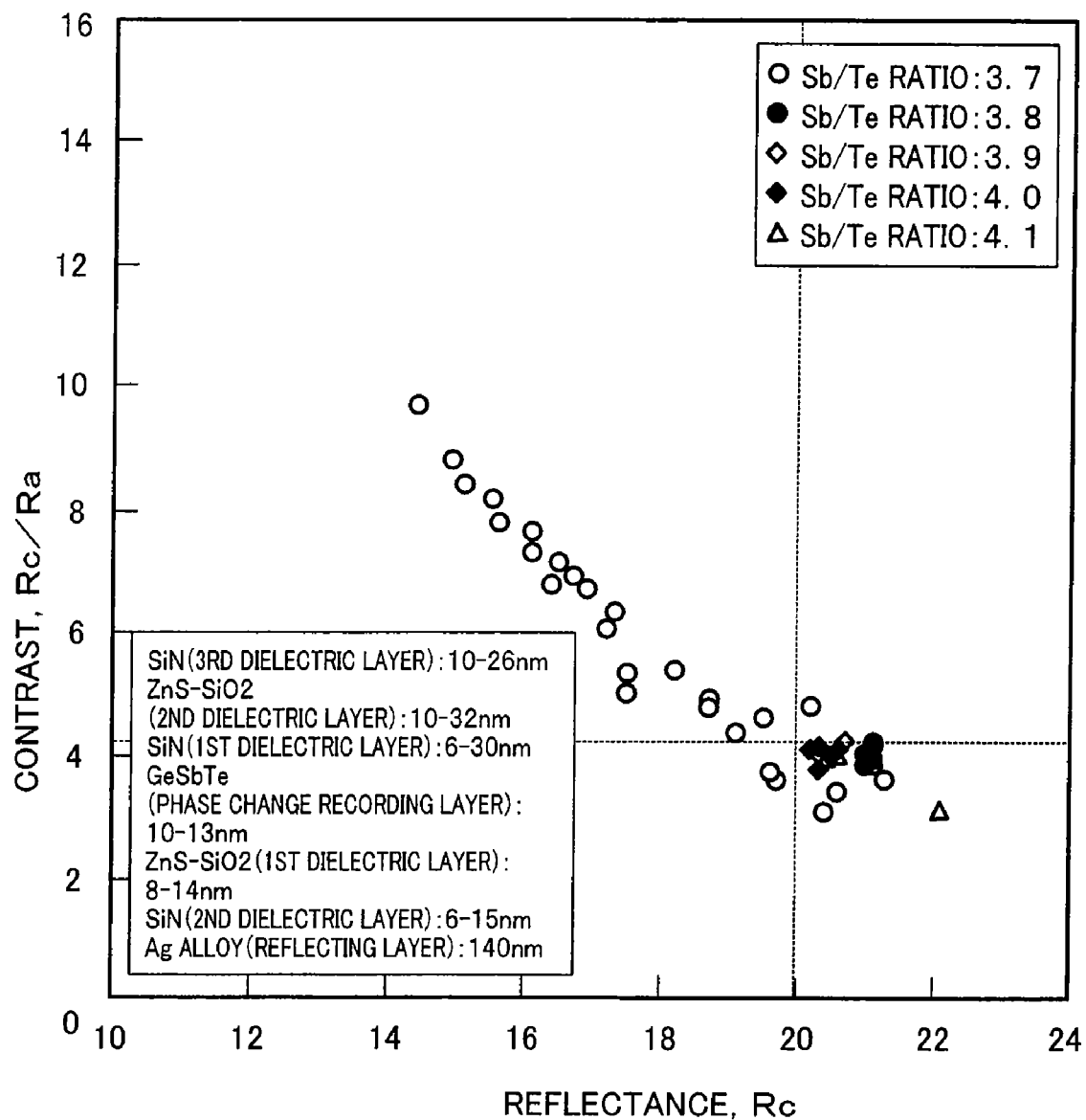
FIG. 4 is a graph showing a relation between a contrast Rc/Ra and reflectance Rc.

However, as shown in FIG. 4, even if the film thickness and compositions of each layer are adjusted, it is impossible that the reflectance ($R_0$) and the contrast (Rc/Ra) are simultaneously fairly larger than 20% and 4 which are requested as standard values, respectively. The reflectance ($R_0$) of only about 20% and the contrast (Rc/Ra) of only about 4 are obtained. This is because the contrast and the reflectance have contradictory natures as shown by the calculation of the multiple interference. Therefore, it is an essence of the invention to suppress the influence of the diffraction caused by the grooves shown in FIG. 3 and to maximize a modulation degree.

Figure 14:
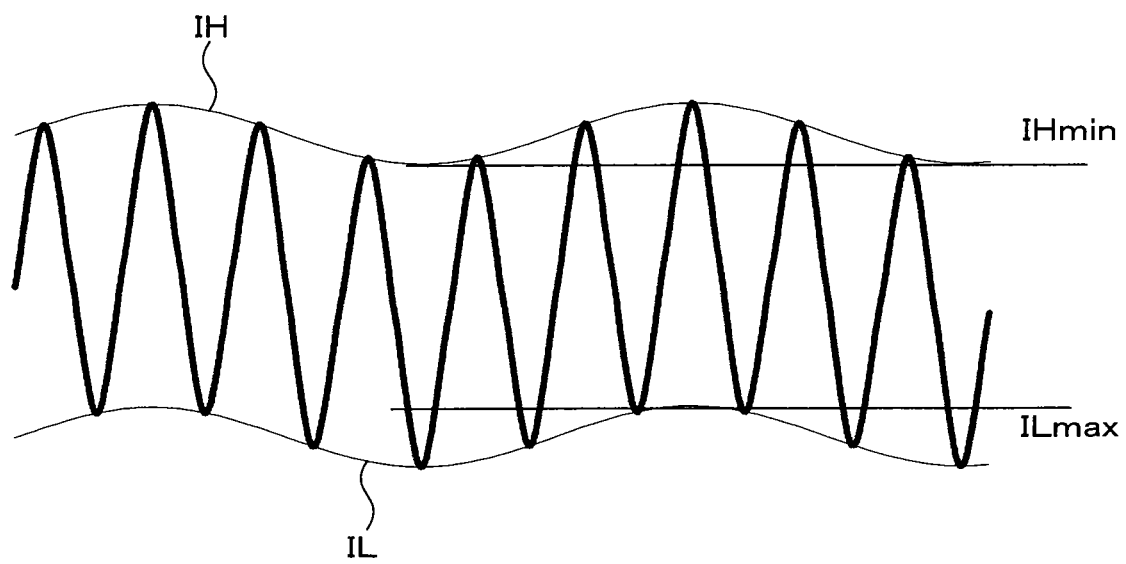
FIG. 14 is a schematic diagram showing an example of a waveform of a reproduction signal of BCA mark of a double-layer BD.

Therefore, as mentioned above, if the BCA reproduction signal is unstable due to the diffraction of the groove signal (refer to FIG. 14), the standard in which the contrast IH/IL is equal to or larger than 4 cannot be satisfied. In the invention, therefore, a depth of groove in the BCA is set to be shallower than that in the data recording area, thereby enabling the BCA reproduction signal to be stably reproduced.

(2) Construction of Optical Disc

Figure 5:
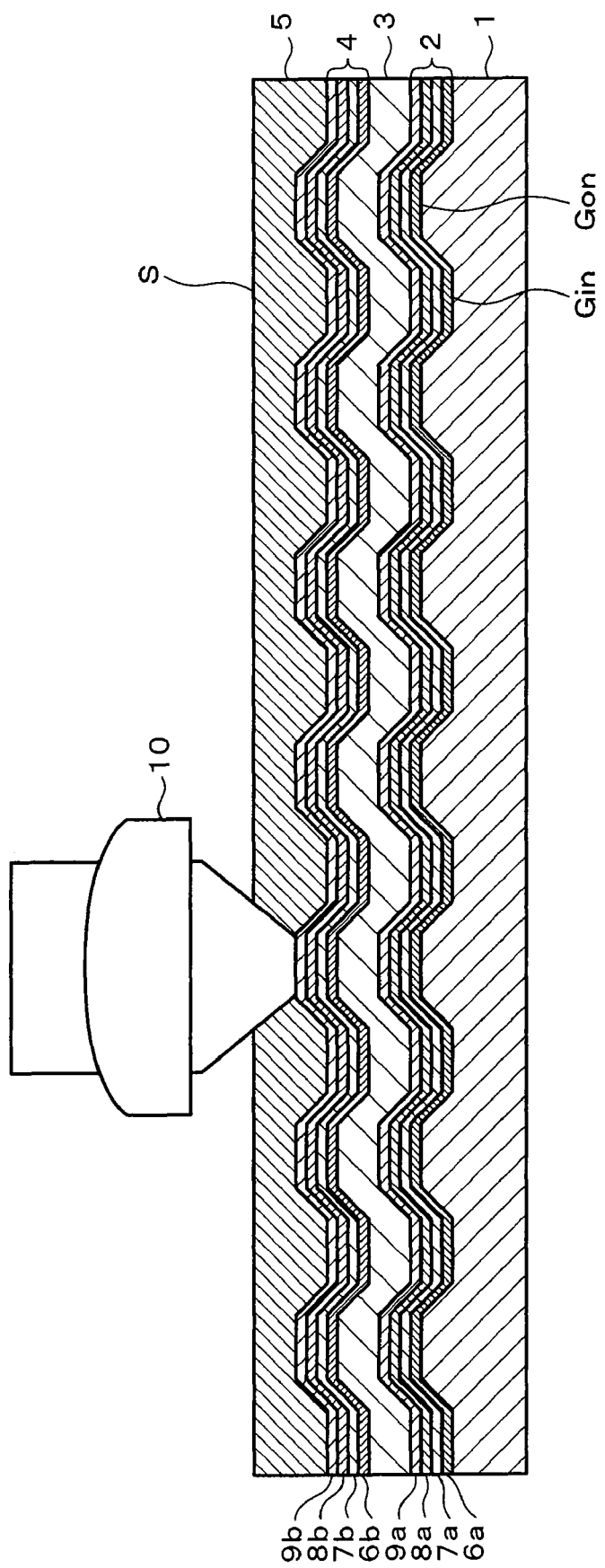
FIG. 5 is a cross sectional view showing an example of a construction of an optical disc according to an embodiment of the invention.
Figure 6:
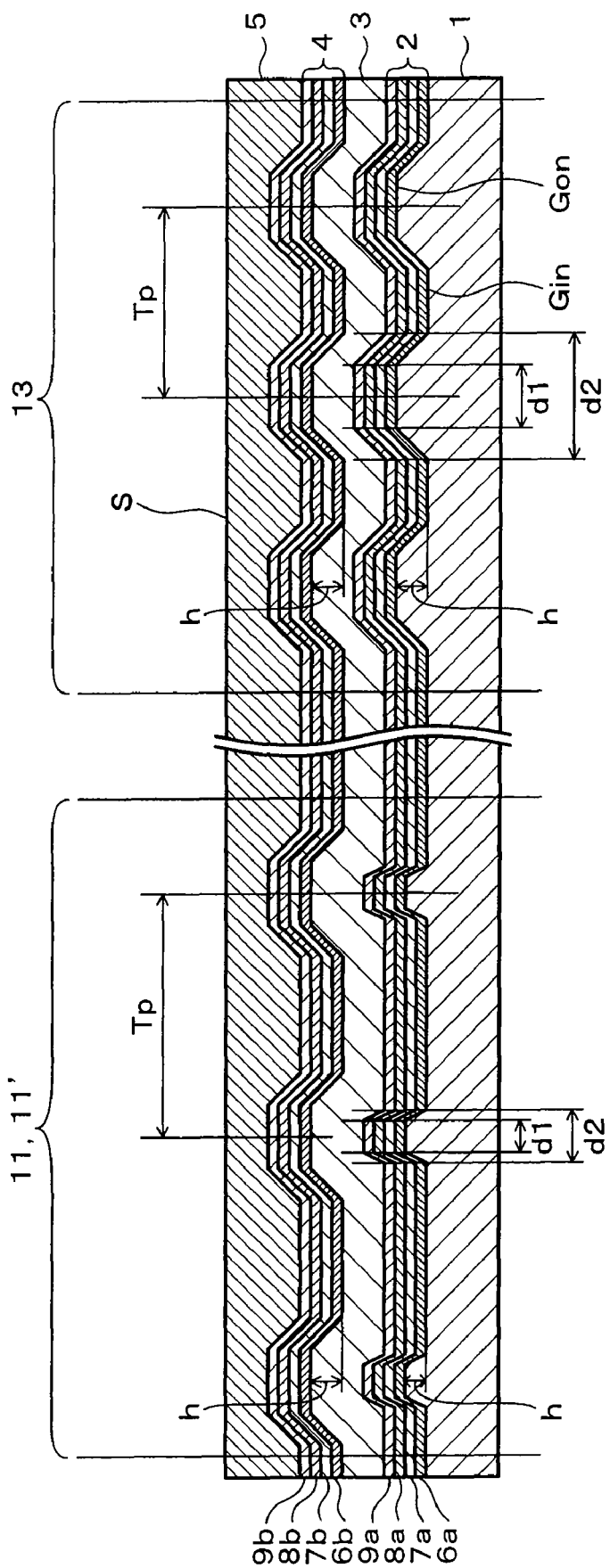
FIG. 6 is a cross sectional view showing an example of a more specific construction of the optical disc according to the embodiment of the invention.
Figure 7:
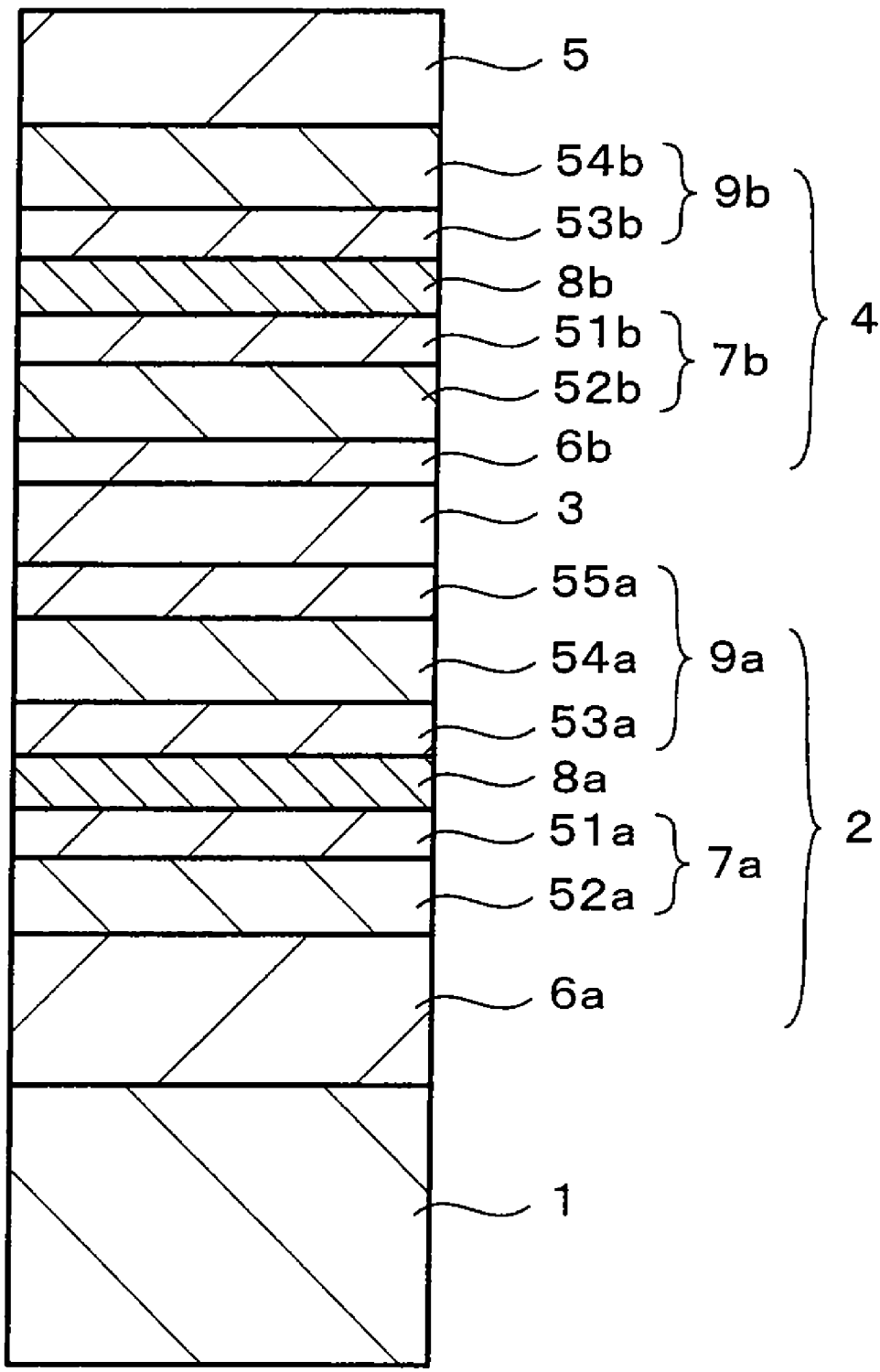
FIG. 7 is a cross-sectional view showing an example of a specific film construction of the optical disc according to the embodiment of the invention.

An embodiment of the invention will be described hereinbelow with reference to the drawings. FIG. 5 shows an example of a construction of an optical disc according to the embodiment of the invention. FIG. 6 shows an example of a more specific construction of the optical disc according to the embodiment of the invention. FIG. 7 shows an example of a specific film construction of the optical disc according to the embodiment of the invention.

This optical disc is a high density optical disc of two layers having a construction in which the L0 layer 2, an intermediate layer 3, the L1 layer 4, and a cover layer are sequentially laminated onto a substrate 1. The L0 layer 2 is formed by sequentially laminating a reflecting layer 6a, a lower dielectric layer 7a, a phase change recording layer 8a, and an upper dielectric layer 9a onto the substrate 1. The L1 layer 4 is formed by sequentially laminating a reflecting layer 6b, a lower dielectric layer 7b, a phase change recording layer 8b, and an upper dielectric layer 9b onto the intermediate layer 3.

The optical disc has a disk-like shape having an opening at the center. A BCA 11, a PIC (control data of the disc) area, and a data recording area are set to the L0 layer 2 from the inner rim side toward the outer rim side of the disc. An inner rim area, a PIC area, and a data recording area are set to the L1 layer 2 from the inner rim side toward the outer rim side of the disc.

In this optical disc, an information signal is recorded and reproduced by irradiating a laser beam from the cover layer 5 side to the L0 layer 2 and the L1 layer 4 as information recording layers. For example, the laser beam having a wavelength in a range from 400 nm to 410 nm is converged by an objective lens 10 having a numerical aperture of 0.84 to 0.86 and irradiated from the cover layer 5 side to one of the L0 layer 2 and the L1 layer 4 as information recording layers, so that the information signal is recorded or reproduced. As such an optical disc, for example, the double-layer BD can be mentioned.

The substrate 1, L0 layer 2, L1 layer 4, intermediate layer 3, and cover layer 5 constructing the optical disc will be sequentially described hereinbelow.

(Substrate)

The substrate 1 has a ring shape in which the opening (hereinbelow, called a center hole) is formed at the center. One principal plane of the substrate 1 is a concave/convex surface. The L0 layer 2 is formed on the concave/convex surface. Hereinbelow, the concave portion far from a laser beam incident plane S in the concave/convex surface is called an in-groove Gin and the convex portion near the laser beam incident plane S in the concave/convex surface is called an on-groove Gon. The convex-shaped on-groove Gon formed in the BCA 11 of the substrate 1 is an example of the first grooves. The convex-shaped on-groove Gon formed in a data recording area 13 of the substrate 1 is an example of the second grooves.

As shapes of the concave-shaped in-groove Gin and the convex-shaped on-groove Gon, for example, various shapes such as spiral shape, concentrical shape, and the like can be mentioned. The in-groove Gin and/or the on-groove Gon has been wobbled in order to add address information.

A width d of the on-groove Gon in the BCA 11 is narrower than a width d of the on-groove Gon in the data recording area 13. A depth (height) h of the on-groove Gon in the BCA 11 is shallower (lower) than a depth (height) h of the on-groove Gon in the data recording area 13. A distance between the adjacent on-grooves Gon, that is, a track pitch Tp in the BCA 11 differs from that in the data recording area 13. The track pitch Tp in the BCA 11 is wider than that in the data recording area 13. By constructing as mentioned above, such a situation that the BCA signal is modulated by the diffraction which is caused by the on-groove Gon can be suppressed. That is, the level fluctuation in the reproduction signal of the BCA marks can be reduced. In other words, the contrast IH/IL can be improved.

It is preferable that a phase depth $\lambda/\alpha n$ (where, $\lambda$: wavelength of the recording or reproducing laser beam, $\alpha$: coefficient of the groove depth, n: refractive index of the intermediate layer to the recording or reproducing laser beam) of the on-groove Gon lies within a range from $\lambda/304.8$ n to $\lambda/16.4$ n, more preferably, a range from $\lambda/304.8$ n to $\lambda/65.3$ n. This is because by setting the phase depth to be within such a range, the contrast IH/IL can be improved.

It is preferable that the depth h of the on-groove Gon lies within a range from 0.9 nm to 16.7 nm, more preferably, a range from 0.9 nm to 4.2 nm. This is because by setting the depth to be within such a range, the contrast IH/IL can be improved.

It is preferable that the width d of the on-groove Gon lies within a range from 55 nm to 126 nm, more preferably, a range from 55 nm to 95 nm. This is because by setting the width to a value within such a range, the contrast IH/IL can be improved.

It is preferable that a ratio (d/Tp) between the width d of the on-groove Gon and the track pitch Tp lies within a range from 0.0275 to 0.063, more preferably, a range from 0.0275 to 0.0475. This is because by setting the ratio to a value within such a range, the contrast IH/IL can be improved. The width d of the on-groove Gon is an average value (d1max+d2min)/2 of a maximum width d1max in a width d1 of the on-groove Gon on the side of the laser beam incident plane S and a minimum width d2min in a width d2 of the on-groove Gon on the side of the bottom portion opposite to the laser beam incident plane S side.

For example, 120 mm is selected as a diameter of the substrate 1. A thickness of substrate 1 is selected in consideration of its rigidity. Preferably, it is selected from a range from 0.3 mm or more to 1.3 mm or less, more preferably, a range from 0.6 mm or more to 1.3 mm or less. For example, 1.1 mm is selected. For example, 15 mm is selected as a diameter of the center hole.

As a material of the substrate 1, a resin material such as polycarbonate system resin, polyolefin system resin, acrylic resin, or the like or glass can be used. It is preferable to use the resin material in consideration of costs or the like. As a resin material, for example, ZEONEX or polycarbonate (hereinbelow, properly abbreviated to PC) (refractive index is equal to 1.59) can be used.

As a molding method of the substrate 1, it is sufficient to use a method whereby a desired shape and smoothness of the substrate surface which is optically adequate are obtained. Such a method is not limited in particular. For example, an injection molding method (injection method) or a photopolymer (2P method) method using an ultraviolet hardening type resin can be used. In the injection molding method, the formed mother stamper is arranged in a die cavity for manufacturing the disc substrate and a transparent resin of polycarbonate is injected, so that the substrate 1 to which micro concave and convex portions corresponding to the groove pattern of the L0 layer 2 formed on a signal forming surface have been transferred is manufactured.

(L0 Layer, L1 Layer)

Each of the L0 layer 2 and L1 layer 4 as information recording layers denotes a layer constructed by a recording film or the like formed on the concave and convex portions of the substrate 1. The L0 layer 2 is a laminate film in which the reflecting layer 6a, a second dielectric layer 52a, a first dielectric layer 51a, the phase change recording layer 8a, a first dielectric layer 53a, a second dielectric layer 54a, and a third dielectric layer 55a are sequentially formed onto the substrate 1.

For example, SiN can be used as a material constructing the second dielectric layer 52a, the first dielectric layer 53a, and the third dielectric layer 55a. For example, ZnS—SiO$_2$ can be used as a material constructing the first dielectric layer 51a and the second dielectric layer 54a.

A phase change material in which a reversible state change is caused by receiving the irradiation of the laser beam can be used as a material constructing the phase change recording layer 8a. As such a phase change material, for example, an eutectic system phase change material or a compound system phase change material in which a reversible phase change between the amorphous state and the crystalline state is caused can be used. It is preferable to use the eutectic system phase change material from viewpoints of the reflectance and a crystallizing speed.

An eutectic system material of an SbTe system can be used as an eutectic system phase change material. It is preferable to add an additive element such as Ag, In, Ge, or the like into the eutectic system material in order to improve conservation durability, adjust the crystallizing speed, improve the modulation degree, and the like. For example, the following systems can be mentioned: a system containing Sb—Te, Ge—Sb—Te, In—Sb—Te, Ag—In—Sb—Te, Au—In—Sb—Te, Ge—Sb—Te—Pd, Ge—Sb—Te—Se, Ge—Sb—Te—Bi, Ge—Sb—Te—Co, or Ge—Sb—Te—Au; a system obtained by introducing a gas filling material such as nitrogen, oxygen, or the like to those systems; and the like.

As a material constructing the reflecting layer 6a, for example, a simple substance such as Al, Ag, Au, Ni, Cr, Ti, Pd, Co, Si, Ta, W, Mo, Ge, or the like or an alloy containing one of them as a main component can be mentioned. Among them, the material of the Al system, Ag system, Au system, Si system, or Ge system is particularly preferable from a viewpoint of practicality. As an alloy, for example, Al—Ti, Al—Cr, Al—Cu, Al—Mg—Si, Ag—Pd—Cu, Ag—Pd—Ti, Si—B, or the like is preferably used. It is preferable to set one of those materials in consideration of optical characteristics and thermal characteristics. For example, it is preferable to use the Al system or Ag system material in consideration of a point that it has high reflectance even in a short wavelength area.

The L1 layer 4 is formed by sequentially laminating a second dielectric layer 52b, a first dielectric layer 51b, the phase change recording layer 8b, a first dielectric layer 53b, and a second dielectric layer 54b onto the intermediate layer 3.

For example, ZnS—SiO$_2$ can be used as a material constructing the first dielectric layers 51b and 53b. For example, SiN can be used as a material constructing the second dielectric layers 52b and 54b.

A phase change material in which a reversible state change is caused by receiving the irradiation of the laser beam can be used as a material constructing the phase change recording layer 8b. As such a phase change material, for example, an eutectic system phase change material or a compound system phase change material in which a reversible phase change between the amorphous state and the crystalline state is caused can be used.

As a material constructing the reflecting layer 6b, for example, a simple substance such as Al, Ag, Au, Ni, Cr, Ti, Pd, Co, Si, Ta, W, Mo, Ge, or the like or an alloy containing some of them as main components can be mentioned. Among them, particularly, the material of the Al system, Ag system, Au system, Si system, or Ge system is preferable in terms of practicality. As an alloy, for example, Al—Ti, Al—Cr, Al—Cu, Al—Mg—Si, Ag—Pd—Cu, Ag—Pd—Ti, Si—B, or the like is preferably used. It is preferable to set one of those materials in consideration of optical characteristics and thermal characteristics. For example, it is preferable to use the Al system or Ag system material in consideration of a point that it has high reflectance even in a short wavelength area.

(Intermediate Layer)

The intermediate layer 3 as a resin layer having a thickness of, for example, 25 μm is formed on the L0 layer 2 formed on the substrate 1. The intermediate layer 3 is made of a transparent resin material. As such a material, for example, a plastic material such as polycarbonate system resin, polyolefin system resin, acrylic resin, or the like can be used. In a manner similar to the substrate 1, the surface serving as a cover layer 5 side of the intermediate layer 3 is a concave/convex surface constructed by the in-groove Gin and the on-groove Gon. The L1 layer 4 is formed on this concave/convex surface.

The intermediate layer 3 is formed as follows. For example, under a vacuum environment, a transparent resin stamper is pressed to a flat ultraviolet hardening type resin with which the L0 layer 2 has been coated. The concave and convex portions of the stamper are transferred to the ultraviolet hardening type resin. Ultraviolet rays are irradiated to the ultraviolet hardening type resin, thereby hardening it.

Also in the intermediate layer 3, in a manner similar to the foregoing substrate 1, the concave portion far from the laser beam incident plane S in the concave/convex surface is called an in-groove Gin and the convex portion near the laser beam incident plane S in the concave/convex surface is called an on-groove Gon. The convex-shaped on-groove Gon formed in the intermediate layer is an example of the third grooves.

As shapes of the concave-shaped in-groove Gin and the convex-shaped on-groove Gon, for example, various shapes such as spiral shape, concentrical shape, and the like can be mentioned. The in-groove Gin and/or the on-groove Gon has been wobbled in order to add the address information.

The on-groove Gon in an inner rim area 11' has the same shape as that of the on-groove Gon in, for example, the data recording area 13. That is, a width d and a depth (height) h of the on-groove Gon in the inner rim area 11' are equal to a width d and a depth (height) h of the on-groove Gon in, for example, the data recording area 13. The in-grooves Gin and on-grooves Gon formed in the inner rim area 11 of the intermediate layer 3 and the data recording area 13 have the shapes similar to those provided in, for example, the data recording area 13 of the substrate 1.

A distance between the adjacent on-grooves Gon, that is, the track pitch Tp in the inner rim area 11 differs from that in the data recording area 13. The track pitch Tp in the BCA 11 is wider than that in the data recording area 13.

(Cover Layer)

The cover layer 5 is formed on the L1 layer 4 formed on the intermediate layer 3. The cover layer 5 is formed for the purpose of protecting the optical disc. The recording and reproduction of the information signal are executed by, for example, converging the laser beam to the information recording layer through the cover layer 5.

As a cover layer 5, for example, it is possible to use a layer constructed by an adhesive layer and a PC sheet, by a UV resin, or by the UV resin and the PC sheet. The cover layer 5 has a thickness of, for example, about 75 µm and is constructed by, for example, the adhesive layer having a thickness of 20 µm and the PC sheet having a thickness of 55 µm.

(Each Area of the Optical Disc)

The BCA, PIC area, and data recording area provided for the optical disc according to an embodiment of the invention will now be described.

FIG. 8 conceptually shows an example of an arrangement of grooves of the L0 layer of the optical disc according to the embodiment of the invention. The case where the on-groove Gon becomes a track for recording the data will be described as an example. In FIG. 8, to make the illustration easy, it is assumed that a width of on-groove Gon provided in each of the BCA 11 and a PIC area 12 and a width of on-groove Gon provided in the data recording area 13 are almost equal. However, as mentioned above, the width d of the on-groove Gon provided in the BCA 11 is narrower than the width d of the on-groove Gon provided in each of the PIC area 12 and the data recording area 13.

A layout of the grooves of a track pitch of 2000 nm is formed in the BCA 11 on the innermost rim side. A layout of the wobble grooves of a track pitch of 350 nm is formed in the PIC area 12 on the outside of the BCA 11. Wobbling grooves of a track pitch of 320 nm are formed in the data recording area 13 on the further outside of the PIC area 12. The grooves formed in each of those areas are formed on the substrate surface so as to run in one spiral shape. A track pitch transition area (not shown) to switch the track pitch is arranged between areas where the track pitch changes.

The BCA 11 is provided in an area of a radius r (=21.3 mm to 22.0 mm). Groove-shaped tracks are formed in the BCA 11. The track pitch is equal to 2000 nm and a sufficiently wide interval is assured. A BCA mark 14 has been recorded in the BCA 11. The BCA mark 14 is data in which binary information such as serial number, lot number, or the like has been converted into a bar code. The BCA mark 14 is used as information peculiar to the optical disc in order to protect the copyright. According to the BCA mark 14, a belt-shaped mark which extends in the radial direction so as to traverse a plurality of grooves of the BCA 11 is formed, for example, over one circumference.

The BCA mark 14 is recorded upon initialization of the optical disc. In the state before the initialization of the optical disc, the L0 layer 2 and the L1 layer 4 as information recording layers are in the amorphous state. With respect to the data recording area 13, such an initialization that the state is changed from the amorphous state to the crystalline state by irradiating the laser beam to the whole area is performed. Upon initialization, such a process that the whole BCA 11 of the L0 layer 2 is initialized and the L0 layer is set into the crystalline state is not executed but by irradiating the laser beam only to desired portions (hatched portions in FIG. 8), they are set into the crystalline state in correspondence to the BCA mark 14. As a result of the above processing step, in the BCA 11 of the L0 layer 2, information is recorded in a bar-code form by a pattern constructed by a bar portion in the amorphous state having a desired width along the circumferential direction and a bar portion in the crystalline state. In the BCA 11 of the L1 layer 4, the information recording in the bar-code form as in the L0 layer 2 is not executed but, for example, such an initialization that the state is changed from the amorphous state to the crystalline state by irradiating the laser beam to the whole area is performed.

The PIC area 12 is a read only area and is provided in an area of the radius r (=22.4 mm to 23.197 mm). Groove tracks each constructed by a layout of rectangular wobble grooves have been formed in the PIC area 12 at a track pitch of 350 nm. The information is reproduced from the layout of the rectangular wobble grooves.

The data recording area 13 is provided in an area of the radius r (=23.2 mm to 58.5 mm). Sine-wave wobble grooves have been formed in the data recording area 13. The track pitch is equal to 320 nm. This is because, by narrowing the track pitch, a large capacity by which the recording and reproduction for a further long time can be executed can be obtained. An area where the data is actually recorded exists on the outer rim side of the radius r (=24.0 mm).

To form the groove suitable for each area, a control signal is used for each area. In the case of forming a DC groove of the BCA 11, the control signal is a direct current (DC) signal. In the case of forming a rectangular wobble groove of the PIC area 12, the control signal is a rectangular signal of biphase modulation. In the case of forming the wobble groove of the data recording area 13, a superimposed signal of MSK (Minimum Shift Keying) of 956 [kHz] and STW (Saw Tooth Wobble) of a double wave is used. The superimposed signal of the MSK and the STW is used to record wobble information of an address.

The reason why the superimposed signal of the MSK and the STW is used is that there is such a problem that although the MSK system is excellent in an S/N ratio (Signal to Noise Ratio), if there is a wobble shift, it is difficult to detect it, while the STW is strong against the wobble shift and it is possible to detect it without a substantial deterioration, and therefore, the address can be certainly detected by combining them.

In a rewritable type BD-RE (Blu-ray Disk ReWritable) disk, one bit of "0" or "1" is expressed by 56 wobbles in total. Those 56 wobbles are set to a unit and this unit is called an ADIP (Address in pregroove) unit. By continuously reading out 83 ADIP units, an ADIP word showing one address is derived. The ADIP word is constructed by: address information of a length of 24 bits; auxiliary data of a length of 12 bits; a reference (calibration) area; data for error correction; and the like. In the BD-RE, three ADIP words are allocated per RUB (Recording unit block, a unit of 64 kbytes) for recording main data.

(3) Manufacturing Method of Optical Disc

An example of the manufacturing method of the optical disc having the construction as mentioned above will now be described with reference to FIGS. 9 to 11.

Figure 9A:
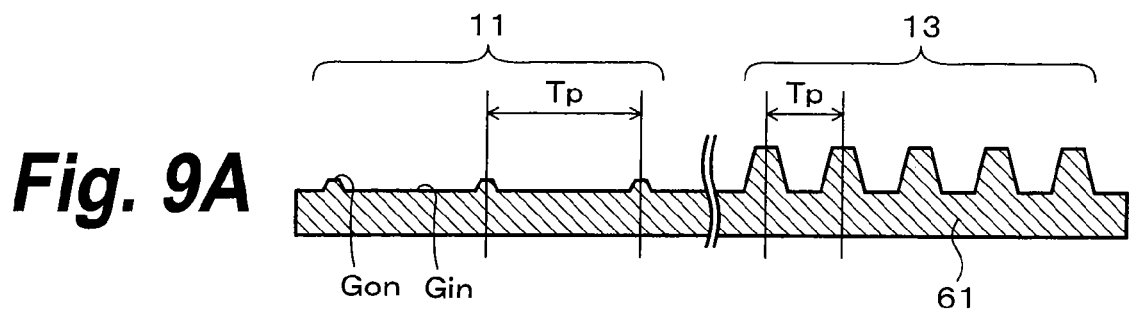
FIG. 9 is a schematic diagram for explaining an example of a manufacturing method of the optical disc according to the embodiment of the invention.

First, an L0 master stamper 61 is formed by, for example, a laser exposure or the like (FIG. 9A). The L0 master stamper 61 has a ring shape in which an opening is formed in a center portion and grooves have been formed on one principal plane.

The groove formed on the L0 master stamper 61, that is, a concave portion is called an in-groove Gin and a convex portion provided between the in-grooves Gin is called an on-groove Gon hereinbelow. The in-groove Gin and the on-groove Gon have the same shapes as those of the in-groove Gin and the on-groove Gon of the substrate 1.

In a manner similar to the foregoing substrate 1, the BCA 11, the PIC area (not shown), and the data recording area 13 are sequentially formed on one principal plane of the L0 master stamper 61 from the center portion toward the outer rim side. The width d of the on-groove Gon of the BCA 11 is narrower than the width d of the on-groove Gon of the data recording area 13 and/or the depth h of the on-groove Gon of the BCA 11 is shallower than the depth h of the on-groove Gon of the data recording area 13. A distance between the adjacent on-grooves Gon, that is, the track pitch Tp in the BCA 11 differs from that in the data recording area 13. The track pitch Tp in the BCA 11 is wider than that in the data recording area 13.

Figure 9B:
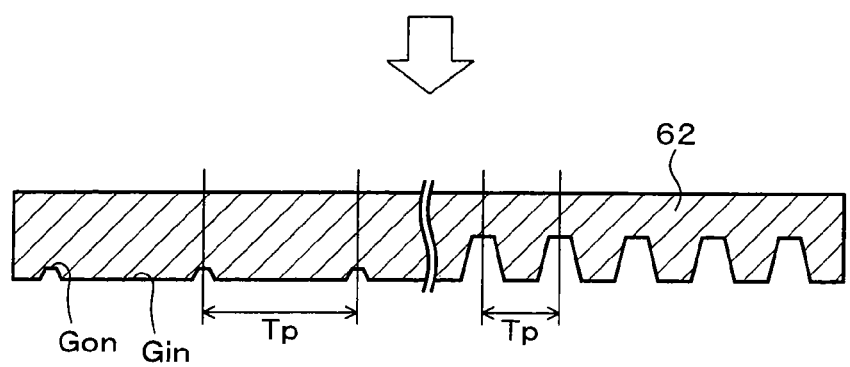

Subsequently, from the L0 master stamper 61, an L0 mother stamper 62 as a reverse stamper is formed by, for example, an MMS (master mother stamper) transfer technique (FIG. 9B). The on-groove Gon and the in-groove Gin having the reversed shapes of those of the on-groove Gon and the in-groove Gin of the L0 master stamper 61 are formed on one principal plane of the L0 mother stamper 62.

Figure 9C:
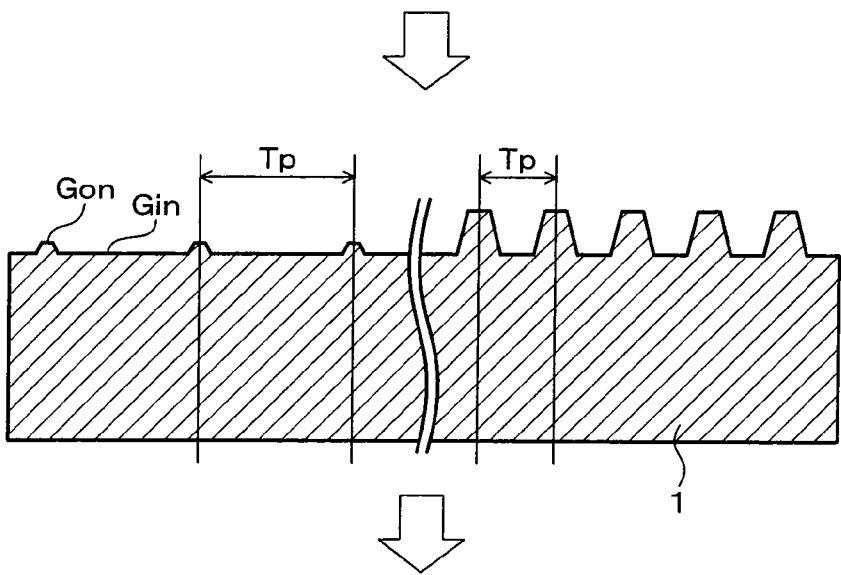

Subsequently, the L0 mother stamper 62 is attached to, for example, a die of an injection molding apparatus and the substrate 1 is molded by the injection molding (FIG. 9C).

Figure 9D:
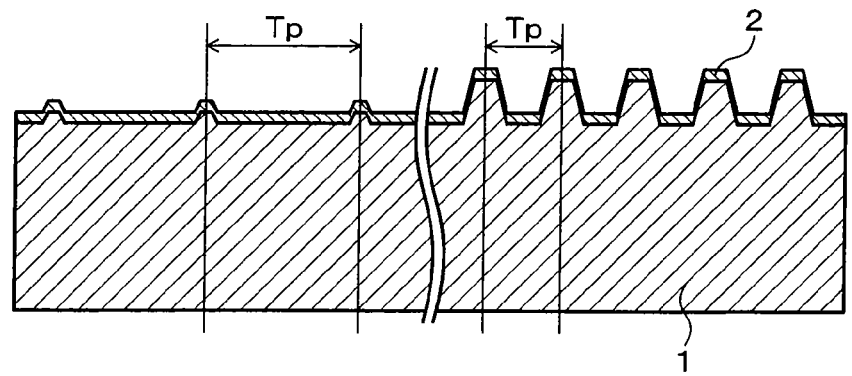

Subsequently, the reflecting layer 6a, lower dielectric layer 7a, phase change recording layer 8a, and upper dielectric layer 9a are sequentially laminated onto the substrate 1 by, for example, a sputtering method. Thus, the L0 layer 2 is formed on the substrate 1 (FIG. 9D).

Figure 10A:
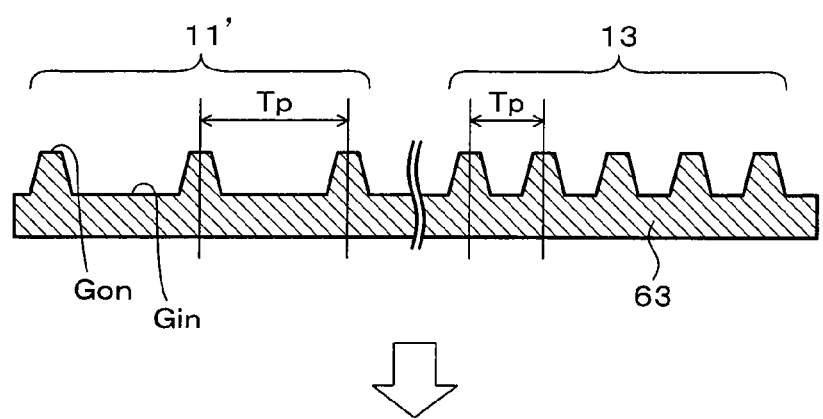
FIG. 10 is a cross sectional view for explaining an example of the manufacturing method of the optical disc according to the embodiment of the invention.

Subsequently, an L1 master stamper 63 is formed by, for example, the laser exposure or the like (FIG. 10A). The L1 master stamper 63 has a ring shape in which an opening is formed in a center portion and grooves have been formed on one principal plane. The groove formed on the L1 master stamper 63, that is, a concave portion is called an in-groove Gin and a convex portion provided between the in-grooves Gin is called an on-groove Gon hereinbelow. The in-groove Gin and the on-groove Gon have the same shapes as those of the in-groove Gin and the on-groove Gon of the intermediate layer 3.

In a manner similar to the foregoing L0 master stamper 61, the inner rim area 11', the PIC area (not shown), and the data recording area 13 are sequentially formed on one principal plane of the L1 master stamper 63 from the center portion toward the outer rim side. The inner rim area 11' and the data recording area 13 of the L1 master stamper 63 exist in the areas of almost the same radii as those of the BCA 11 and the data recording area 13 of the L0 master stamper 61, respectively. The in-groove Gin and the on-groove Gon existing in the inner rim area 11' of the L1 master stamper 63 have almost the same shapes as those of the in-groove Gin and the on-groove Gon existing in the data recording area of the L1 master stamper 63, respectively. The in-grooves Gin and the on-grooves Gon existing in the inner rim area 11' and the data recording area 13 of the L1 master stamper 63 have shapes similar to those of the in-groove Gin and the on-groove Gon provided in, for example, the data recording area 13 of the L0 master stamper 61, respectively.

A distance between the adjacent on-grooves Gon, that is, the track pitch Tp in the inner rim area 11' differs from that in the data recording area 13. The track pitch Tp in the inner rim area 11' is wider than that in the data recording area 13.

Figure 10B:
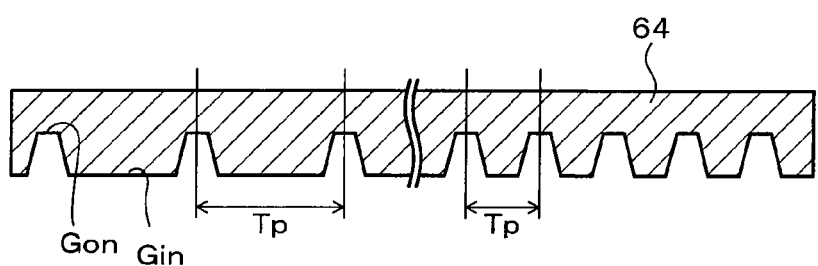

Subsequently, the L1 mother stamper 63 is attached to, for example, the die of the injection molding apparatus and an L1 resin stamper 64 is molded by the injection molding (FIG. 10B).

Figure 11A:
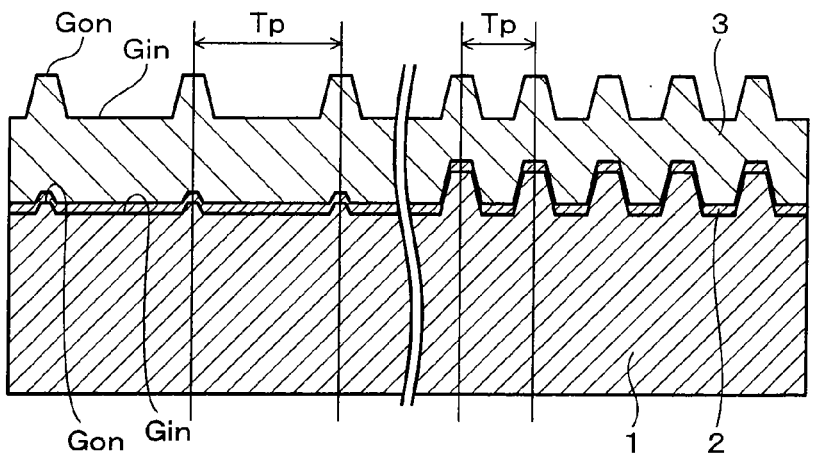
FIG. 11 is a cross sectional view for explaining an example of the manufacturing method of the optical disc according to the embodiment of the invention.

Subsequently, the substrate 1 is uniformly coated with an ultraviolet hardening type resin by, for example, a spin coating method. After that, in-grooves Gin and on-grooves Gon of the L1 resin stamper 64 are transferred to the ultraviolet hardening type resin with which the substrate 1 has uniformly been coated. Thus, the intermediate layer 3 provided with the in-grooves Gin and the on-grooves Gon is formed (FIG. 11A).

Figure 11B:
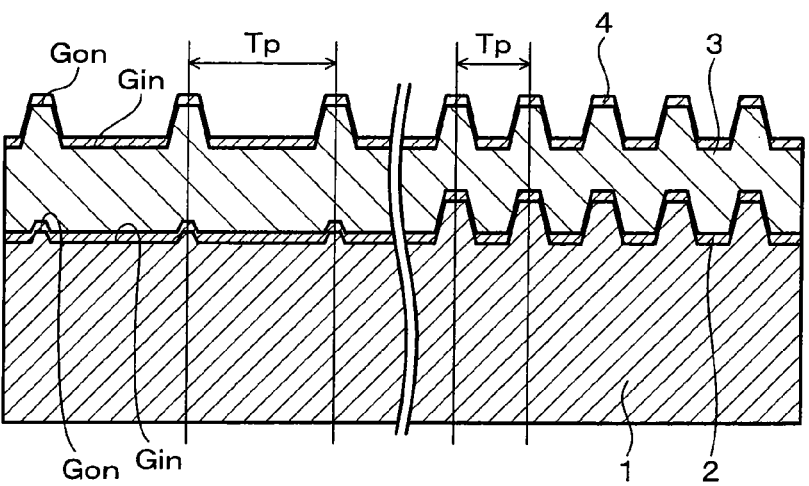
Figure 11C:
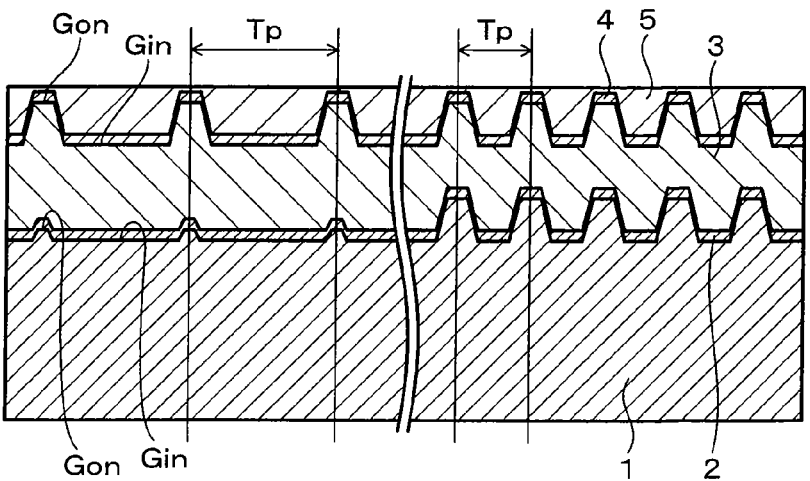

Subsequently, the reflecting layer 6b, lower dielectric layer 7b, phase change recording layer 8b, and upper dielectric layer 9b are sequentially laminated over the substrate 1 by, for example, the sputtering method. Thus, the L1 layer 4 is formed over the substrate 1 (FIG. 11B).

Subsequently, a ring-shaped light transmitting sheet is adhered to the concave/convex surface side of the substrate 1 by using a PSA (Pressure Sensitive Adhesive) with which one principal plane of this sheet has previously and uniformly coated. Thus, the cover layer 5 is formed on the L1 layer 4 (FIG. 1C).

In this manner, the target optical disc is obtained.

EMBODIMENT

The invention will be specifically described hereinbelow with respect to embodiments. The invention is not limited only to those embodiments. In the following embodiments, portions corresponding to those in the foregoing embodiment are designated by the same reference numerals.

Figure 12:
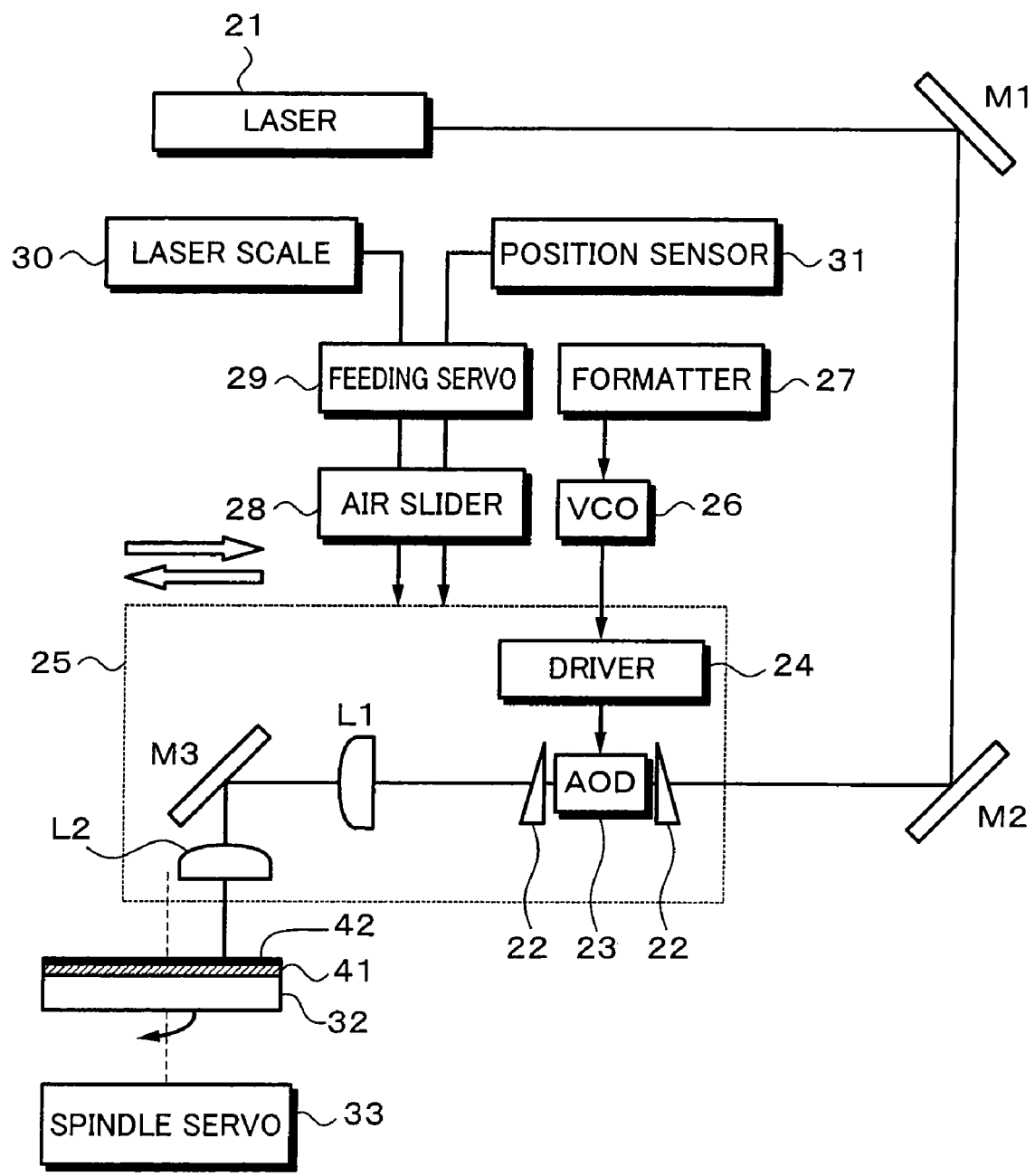
FIG. 12 is a schematic diagram showing a construction of an optical recording apparatus which is used to manufacture a glass mother disc.
Figure 13:
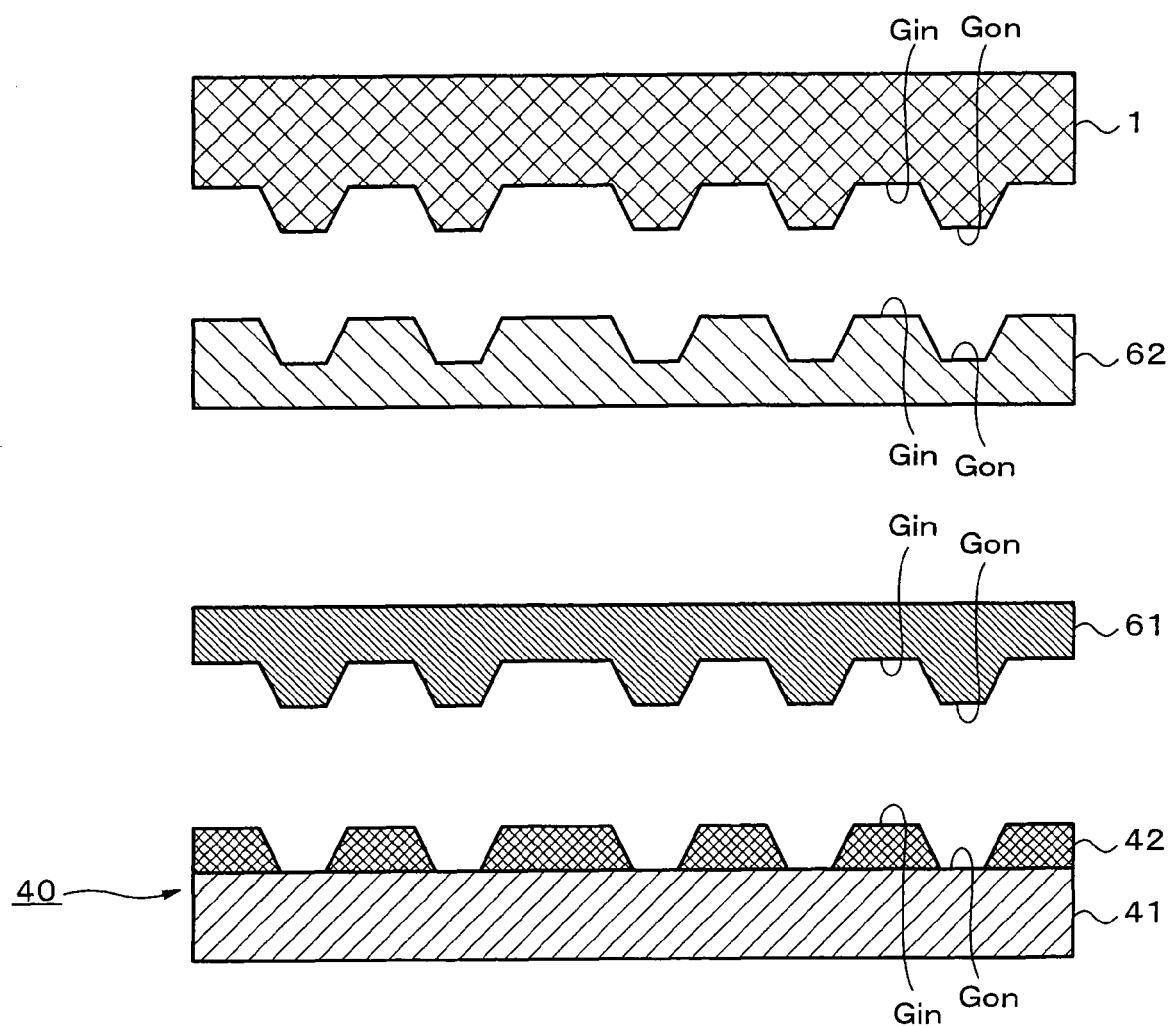
FIG. 13 is a cross sectional view for explaining the manufacturing method of the optical disc of the embodiment.

FIG. 12 is a schematic diagram showing a construction of an optical recording apparatus which is used to manufacture a glass mother disc. FIG. 13 is a cross sectional view for explaining the manufacturing method of the optical disc of the embodiment.

(Optical Recording Apparatus)

First, the optical recording apparatus (also referred to as a cutting apparatus) which is used to manufacture the glass mother disc will be described with reference to FIG. 12.

The optical recording apparatus has a laser light source 21, a moving optical table 25, a turntable 32, and a spindle servo 33 as main portions.

The laser light source 21 is a light source for exposing a resist layer 42 deposited as a film onto the surface of a glass mother disc 41 as a record medium. The laser light source 21 oscillates a laser beam for recording having, for example, the wavelength $\lambda$ (=266 nm). The light source for exposing is not limited only to such a laser light source in particular. The laser beam emitted from the laser light source 21 goes straight as a parallel beam state and is reflected by mirrors M1 and M2, so that its direction is changed and the laser beam is guided to the moving optical table 25.

An AOM/AOD (Acoustic Optical Modulator/Acoustic Optical Deflector) 23 and two wedge prisms 22 are arranged in the moving optical table 25. The AOM/AOD 23 and the wedge prisms 22 are arranged in such a manner that the laser beam which entered in the parallel beam state and a lattice plane formed by the AOM/AOD 23 satisfy a Bragg condition and a horizontal height of the beam is not changed. Tellurium oxide ($TeO_2$) is preferable as an acoustic optical device which is used in the AOM/AOD 23.

A predetermined signal is supplied to the AOM/AOD 23 from a driver 24 for driving. This signal is a DC signal of a predetermined level in the case where the rectilinear on-groove Gon is formed in the BCA 11. A high frequency signal is supplied to the driver 24 for driving from a voltage frequency controller (VCO: Voltage Controlled Oscillator) 26. A control signal is supplied to the VCO 26 from a formatter 27.

The AOM/AOD 23 uses such a principle that an intensity of the primary diffracted light in Bragg diffraction is almost proportional to an ultrasonic power. The AOM/AOD 23 modulates the ultrasonic power on the basis of the recording signal, thereby performing light modulation of the laser beam. To realize the Bragg diffraction, a positional relation and the position of the AOM/AOD 23 to an optical axis of the laser beam are set so as to satisfy the Bragg condition: $2 d \sin \theta = n\lambda$ (d: lattice interval, $\lambda$: wavelength of the laser beam, $\theta$: angle which is defined between the laser beam and the lattice plane, n: integer).

As a control signal from the VCO 26, a direct current (DC) signal is used in the BCA 11, a rectangular signal of biphase modulation is used in the PIC area 12, and the superimposed signal of the MSK (Minimum Shift Keying) of 956 [kHz] and the STW (Saw Tooth Wobble) of the double wave is used in the data recording area.

The laser beam modulated and deflected as mentioned above is irradiated to the resist layer 42 of the glass mother disc 41 by a mirror M3 and an objective lens L2. A latent image of the on-groove Gon of each of the desired BCA 11, PIC area 12, and data recording area 13 is formed.

Cutting is performed under the following conditions by using the optical recording apparatus having the construction as mentioned above.

In the optical recording apparatus, the pattern in which the groove track formed by the layout of the on-grooves Gon of the track pitch of 2000 nm in the BCA 11, the groove track formed by the layout of the rectangular wobble grooves (on-grooves Gon) of the track pitch of 350 nm in the PIC area 12, and the groove track as wobbling grooves (on-grooves Gon) which have been sine-wave wobbled in the data recording area 13 run in one spiral line is formed in the resist layer 42 on the glass mother disc 41.

Upon cutting, a rotational speed of the turntable 32 is controlled so that a linear velocity in the longitudinal direction of the track is equal to 5.28 [m/sec], a feeding pitch of the moving optical table 25 is changed every area, and the exposure is performed. The feeding pitch is set to 2.000 μm (2000 nm) in the BCA 11, to 0.350 μm (350 nm) in the PIC area 12, and to 0.320 μm (320 nm) in the data recording area 13.

In the above optical recording apparatus, the position of the moving optical table 25 is detected by a position sensor 31, the exposure is performed at the timing and pitch corresponding to each area, and the latent image of the groove pattern of the BCA 11, PIC area 12, and data recording area 13 can be exposed to the resist on the glass mother disc 41.

The wavelength (for example, 0.78 μm) which is detected by a laser scale 30 is used as a reference, the operations of a feeding servo 29 and an air slider 28 are controlled, and the feeding pitch of the moving optical table 25 is gradually changed.

The feeding pitch in the BCA 11 (radius r=21.0 mm to 22.0 mm) is equal to 2000 nm. In the track pitch transition area (radius r=22.0 mm to 22.4 mm) between the BCA 11 and the PIC area 12, the feeding pitch is gradually changed from 2000 nm to 350 nm. The feeding pitch in the PIC area 12 (radius r=22.4 mm to 23.197 mm) is equal to 350 nm. In the track pitch transition area (radius r=23.197 mm to 23.2 mm) between the PIC area 12 and the data recording area 13, the feeding pitch is gradually changed from 350 nm to 320 nm. In the data recording area 13 (radius r=23.2 mm to 58.5 mm), the feeding pitch is equal to 320 nm. The on-grooves Gon are formed at such feeding pitches.

Subsequently, a resist substrate is developed by using a developing apparatus (not shown). First, a resist substrate 40 on which the latent image of the on-grooves Gon has been formed as mentioned above is put onto the turntable 32 of the developing apparatus so that the resist layer 42 is positioned in the upper portion. The turntable is rotated. After that, a developing solution is dropped onto the resist layer 42 and the resist is developed. Thus, the resist substrate 40 is obtained.

That is, by the above step, the resist substrate 40 is developed and there is obtained the resist substrate 40 in which the groove tracks as an on-groove Gon in the BCA 11 (track pitch of 2000 nm), a rectangular wobble groove (on-groove Gon) in the PIC area 12 (track pitch of 350 nm), and a wobbling groove (on-groove Gon) in which the MSK and the STW have been multiplexed in the data recording area 13 (track pitch of 320 nm) have been patterned on the surface in the state where they run in one spiral line.

Subsequently, a conductive film layer made of a nickel coating film is formed onto the concave/convex pattern of the resist substrate 40 by an electroless plating method or the like. After that, the resist substrate in which the conductive film layer has been formed is attached to an electroforming apparatus and a nickel plating layer is formed onto the conductive film layer by an electric plating method so as to have a thickness of about 300 μm.

Subsequently, the nickel plating layer is peeled off by a cutter or the like from the glass mother disc 41 on which the nickel plating layer has been formed. Then, the resist on the signal forming surface of the peeled-off nickel plating layer is cleaned by using acetone or the like and the stamper 61 is formed. Thereafter, the mother stamper 62 having the reversed concave and convex pattern is formed. Further, the substrate 1 is formed by injection molding by using the mother stamper 62 and a transparent resin of polycarbonate (refractive index: 1.59). The resin stamper 64 to transfer the concave and convex pattern of the L1 layer to the intermediate layer 3 is also formed in a manner similar to the substrate 1.

A double-layer BD as shown in FIG. 5 is formed by using the foregoing substrate 1 and resin stamper 64. In the embodiment, discs in which the depth and width of the on-groove Gon in the BCA 11 of the L0 layer are changed as shown in Table 2 are formed as a double-layer BD serving as a disc for evaluation.

A film construction of the double-layer BD is as follows.

L0 Layer 2
    Reflecting layer 6a: Ag, 140 nm
    Second dielectric layer 52a: SiN, 10 nm
    First dielectric layer 51a: ZnS—$SiO_2$, 10 nm
    Phase change recording layer 8a: GeSbTe, 10 nm
    First dielectric layer 53a: SiN, 10 nm
    Second dielectric layer 54a: ZnS—$SiO_2$, 30 nm
    Third dielectric layer 55a: SiN, 10 nm L1 Layer 4
    Reflecting layer 6b: Ag, 10 nm
    Second dielectric layer 52b: SiN, 10 nm
    First dielectric layer 51b: ZnS—$SiO_2$, 10 nm
    Phase change recording layer 8b: GeSbTe, 6 nm
    First dielectric layer 53b: ZnS—$SiO_2$, 10 nm
    Second dielectric layer 55b: SiN, 10 nm The intermediate layer 3 is formed by pressing the resin stamper 64 to the ultraviolet hardening type resin and hardening the ultraviolet hardening type resin. A thickness of intermediate layer 3 is set to 25 μm.

The cover layer 5 is formed by adhering a light transmitting sheet by the PSA. A thickness of light transmitting sheet and a thickness of PSA are set so that a thickness of cover layer 5 is equal to 75 μm.

Subsequently, IH/IL characteristics of the reproduction signal of the BCA mark are measured with respect to the double-layer BD manufactured as mentioned above. A measurement result is shown in Table 2. The reproduction of the BCA mark is evaluated by using an optical disc evaluating apparatus having an optical pickup having a wavelength of 406 nm and an NA=0.85. The evaluating apparatus has a magnescale having a resolution of 5 μm and can accurately measure a radial position of an address. The depth h and width d of the on-groove Gon are those at the stage of the substrate 1 before it is coated with the L0 layer 2 as an information recording layer. The depth h of the on-groove Gon corresponds to the distance from the surface of the substrate 1 to the bottom portion of the on-groove Gon. The width d of the on-groove Gon is equal to an average value (d1max+d2min)/2 of the maximum width d1max on the surface side and the minimum width d2 min on the bottom portion side. The shape of the on-groove Gon is measured by an AFM (Atomic Force Microscope).

As will be understood from Table 2, if the depth is set to the depth h of the on-groove Gon of each of Band 5 to Band 7, the standard of (IH/IL>4.0) is satisfied. Further, if the depth is set to the depth h of the on-groove Gon of each of Band 5 to Band 7, IH/IL≧4.09.

Therefore, it is preferable that the depth of on-groove Gon lies within a range from 0.9 nm to 16.7 nm, more preferably, within a range from 0.9 nm to 4.2 nm. A phase depth $\lambda/\alpha n$ of the groove of each of Band 2 to Band 7 in this case is as follows.

$\lambda/304.8$ n to $\lambda/16.4$ n (n is a refractive index of the intermediate layer; 1.48)

$\lambda/304.8$ n (where, $\alpha$=406 nm/(1.48×0.9 [nm])=304.8)

$\lambda/16.4$ n (where, $\alpha$=406 nm/(1.48×16.7 [nm])=16.4)

A phase depth $\lambda/\alpha n$ of the on-groove Gon of each of Band 5 to Band 7 is as follows.

$\lambda/304.8$ n to $\lambda/65.3$ n (n is a refractive index of the intermediate layer; 1.48)

TABLE 2

| BAND | RADIAL POSITION START [mm] | RADIAL POSITION END [mm] | TRACK PITCH [μm] | GROOVE DEPTH [nm] | GROOVE WIDTH [nm] | CUTTING POWER [%] | IH/IL | FORMAT |
|---|---|---|---|---|---|---|---|---|
| 1 | 20.915 | 21.153 | 2.000 | 24 | 170 | 160.0 | 3.88 | BCA |
| 2 | 21.153 | 21.302 | 2.000 | 16.7 | 126.0 | 150.0 | 4.02 | BCA |
| 3 | 21.302 | 21.451 | 2.000 | 12.4 | 115.0 | 140.0 | 4.05 | BCA |
| 4 | 21.451 | 21.600 | 2.000 | 7.5 | 103.0 | 130.0 | 4.07 | BCA |
| 5 | 21.600 | 21.750 | 2.000 | 4.1 | 95.0 | 120.0 | 4.09 | BCA |
| 6 | 21.750 | 21.899 | 2.000 | 1.7 | 77.0 | 110.0 | 4.10 | BCA |
| 7 | 21.899 | 22.050 | 2.000 | 0.9 | 55.0 | 100.0 | 4.12 | BCA |
| 8 | 22.050 | 23.250 | 0.350 | 24 | 174 | 200.0 | | PIC |
| 9 | 23.250 | 58.017 | 0.320 | 24 | 178 | 200.0 | | MSK&STW |
| 10 | 58.017 | 58.500 | 0.320 | 24 | 176 | 200.0 | | MSK |

In the measurement result shown in Table 2, the depth and width of the on-groove Gon and the contrast (IH/IL) in the case where the BCA 11 is divided into Bands 1 to 7 and a cutting power is decreased by 10% at a time from Band 1 to Band 7 are shown. The cutting power in Table 2 is shown by a percentage by using a limit laser power (laser power of Band 7) by which the groove can be formed as a reference.

As will be understood from Table 2, when the cutting power of Band 1 is equal to 160%, the resist layer 42 in a range to the position on the glass mother disc 41 is removed and a cross sectional shape of the on-groove Gon is a U-character shape. This groove shape is similar to that of the on-groove Gon in the data recording area 13. In a range from B and 2 (cutting power=150%) to Band 7 (cutting power=100%), a standard of (IH/IL>4.0) is satisfied. That is, the BCA mark in the BCA 11 can be preferably reproduced.

At the cutting powers in a range from Band 2 to Band 7, the resist layer 42 is not removed until the surface of the glass mother disc 41 appears. A cross sectional shape of the on-groove Gon is a V-character shape. In a range from Band 5 (cutting power=120%) to Band 7 (cutting power=100%), IH/IL≧4.09. That is, the BCA mark in the BCA 11 can be preferably reproduced. More preferably, Band 5 (cutting power=120%, IH/IL=4.09), Band 6 (cutting power=110%, IH/IL=4.10), and Band 7 (cutting power=100%, IH/IL=4.12) are set.

Therefore, it is desirable to set the cutting power in the BCA 11 to be smaller than that in the data recording area 13. Specifically speaking, it is preferable that the cutting power in the BCA 11 lies within a range from 100% to 150%, more preferably, within a range from 100% to 120%.

$\lambda/304.8$ n (where, $\alpha$=406 nm/(1.48×0.9 [nm])=304.8)

$\lambda/65.3$ n (where, $\alpha$=406 nm/(1.48×4.2 [nm])=16.4)

As will be understood from Table 2, if the width is set to the width of on-groove Gon of each of Band 2 to Band 7, the standard of (IH/IL>4.0) is satisfied. Further, if the width is set to the width of on-groove Gon of each of Band 5 to Band 7, IH/IL≧4.09.

Therefore, it is preferable that the width of on-groove Gon in the BCA 11 lies within a range from 55 nm to 126 nm, more preferably, within a range from 55 nm to 95 nm.

If the width of on-groove Gon is normalized by the track pitch, the width d/track pitch Tp of the on-groove Gon of each of Band 2 to Band 7 is as follows.

0.0275 to 0.063

0.0275 (where, 55 [nm]/2000 [nm]=0.0275)

0.063 (where, 126 [nm]/2000 [nm]=0.063)

The width (d)/track pitch (Tp) of the on-groove Gon of each of Band 5 to Band 7 is as follows.

0.0275 to 0.0475

0.0275 (where, 55 [nm]/2000 [nm]=0.0275)

0.0475 (where, 95 [nm]/2000 [nm]=0.0475)

In the shape of the on-groove Gon in the BCA 11 mentioned above, the standard of (IH/IL>4.0) is satisfied. The bar-code signal recorded in the BCA 11 can be preferably reproduced.

As will be understood from Table 2, if the depth h and the width d of the on-groove Gon in the BCA 11 are set to be shallower and narrower than those of the on-groove Gon in the data recording area 13, the bar-code signal recorded in the BCA 11 can be preferably reproduced.

Also in the case where the depth h of the on-groove Gon in the BCA 11 is shallower than the depth h of the on-groove Gon in the data recording area 13 and the width d of the on-groove Gon in the BCA 11 is set to be almost equal to the width d of the on-groove Gon in the data recording area 13, such an effect that the bar-code signal recorded in the BCA 11 can be preferably reproduced is obtained.

Even in the case where the width d of the on-groove Gon in the BCA 11 is narrower than the width d of the on-groove Gon in the data recording area 13 and the depth h of the on-groove Gon in the BCA 11 is set to be almost equal to the depth h of the on-groove Gon in the data recording area 13, the above effect can be similarly obtained.

From the above results, even in an optical disc whose density is higher or lower than that of the double-layer BD, it will be understood that by setting the phase depth $\lambda/\alpha n$ and the ratio (d/Tp) between the width d of the on-groove Gon and the track pitch Tp to values within the foregoing numerical value ranges, the bar-code signal recorded in the BCA 11 can be preferably reproduced.

Although the embodiment of the invention has specifically been described above, the invention is not limited to the foregoing embodiment but various kinds of modifications based on the technical idea of the invention are possible.

For example, although the foregoing embodiment has been described with respect to the example in which the format is spirally recorded and formed from the inner rim to the outer rim, in the case where a feeding precision at the time when the format is recorded and formed contrarily from the outer rim to the inner rim is high, the format can be also recorded and formed in two different information layers from the outer rim to the inner rim. The invention is not limited to the double layers but can be also applied to a multilayer format such as three layers, four layers, or the like.

Although the foregoing embodiment has been described with respect to the case where the invention is applied to the rewritable type optical disc as an example, the invention is not limited to such an example but can be also applied to a read only type optical disc and a WORM type optical disc.

The invention can be also applied to various optical discs other than the BD and can be also applied to not only the optical disc in the related art but also an optical disc of the next generation whose density is further higher than that of the optical disc such as a BD or the like.

Although the foregoing embodiment has been described with respect to the case where the mother disc for the record medium is manufactured by using the organic resist as an example, the mother disc for the record medium can be also manufactured by using an inorganic resist.

Although the foregoing embodiment has been described with respect to the case where the first area (BCA) is provided on the innermost rim side, the position where the first area is provided is not limited to the innermost rim side but can be also provided in an arbitrary area of the optical disc such as outermost rim side, an intermediate area between the innermost rim and the outermost rim, or the like.

The invention claimed is:

1. A record medium comprising:
    a substrate;
    at least a first information layer on said substrate;
    a transparent intermediate layer on said first information layer;
    a second information layer on said transparent intermediate layer;
    a transparent protecting layer above said second information layer,
    wherein,
        said substrate comprises first grooves in a first area and second grooves in a second area,
        said first information layer comprises third grooves;
        predetermined binary information previously recorded on said first grooves, and
        each of said first grooves is shallower or narrower than each of said second grooves.

2. A record medium according to claim 1, wherein said first and said second information layers are phase change type recording layers and said predetermined binary information has been recorded upon initialization of said first information layer.

3. A record medium according to claim 1, wherein said first information layer is a phase change type recording layer made of an SbTe system eutectic system material.

4. A record medium according to claim 1, wherein
    in a cutting step of forming a stamper to mold said substrate, a power of a laser for exposure corresponding to said first grooves is set to be smaller than a power of a laser for exposure corresponding to said second grooves, and said record medium is manufactured.

5. A record medium according to claim 1, wherein a depth of each of said first grooves is within a range from 0.9 to 16.7 nm.

6. A record medium according to claim 1, wherein a phase depth of each of said first grooves is within a range from $\lambda/304.8n$ to $\lambda/16.4n$,
    where, $\lambda$ is a wavelength of a recording or reproducing laser beam, and n is a refractive index of the transparent intermediate layer to the recording or reproducing laser beam.

7. A record medium according to claim 1, wherein a width of each of said first grooves is within a range from 55 to 126 nm.

8. A record medium according to claim 1, wherein a groove width/track pitch ratio of said first grooves is within a range from 0.0275 to 0.063.

9. A record medium according to claim 1, wherein said binary information is recorded as a bar-code-like mark.

10. A record medium according to claim 1, wherein said first area is an innermost rim area and said second area is a data recording area.

11. A record medium according to claim 1, wherein each of said first grooves is shallower and narrower than each of said second grooves.

12. A record medium according to claim 7, wherein the width of each of said first grooves is within a range from 55 to 95 nm.

13. A record medium according to claim 1, wherein each of said third grooves has the same width and depth of each of said second grooves.

* * * * *